US011489705B1

(12) United States Patent
Casey et al.

(10) Patent No.: US 11,489,705 B1
(45) Date of Patent: Nov. 1, 2022

(54) INTEGRATED CIRCUIT INCLUDING A CONTINUOUS TIME LINEAR EQUALIZER (CTLE) CIRCUIT AND METHOD OF OPERATION

(71) Applicant: XILINX, INC., San Jose, CA (US)

(72) Inventors: Ronan Sean Casey, Cork (IE); Kevin Zheng, San Jose, CA (US); Catherine Hearne, Fermoy (IE)

(73) Assignee: XILINX, INC., San Jose, CA (US)

( * ) Notice: Subject to any disclaimer, the term of this patent is extended or adjusted under 35 U.S.C. 154(b) by 42 days.

(21) Appl. No.: 17/019,035

(22) Filed: Sep. 11, 2020

(51) Int. Cl.
*H04L 25/03* (2006.01)
*H04L 25/02* (2006.01)
*H04L 27/01* (2006.01)

(52) U.S. Cl.
CPC .... *H04L 25/03885* (2013.01); *H04L 25/0212* (2013.01); *H04L 27/01* (2013.01)

(58) Field of Classification Search
CPC .......... H04L 25/03885; H04L 25/0212; H04L 27/01
See application file for complete search history.

(56) References Cited

U.S. PATENT DOCUMENTS

| 7,948,309 B2 * | 5/2011 | Mak | H03F 1/083 330/98 |
| 9,118,447 B1 | 8/2015 | Malhotra | |
| 9,461,851 B1 | 10/2016 | Liao | |
| 9,654,310 B1 * | 5/2017 | Chang | H03H 15/02 |
| 9,948,185 B2 | 4/2018 | Unno | |
| 2010/0316172 A1 * | 12/2010 | Keehr | H04B 1/109 375/346 |
| 2013/0114665 A1 * | 5/2013 | Aziz | H03F 3/45183 330/69 |

FOREIGN PATENT DOCUMENTS

| EP | 2804313 A1 * | 11/2014 | ............. H03F 1/342 |
| WO | WO-2007001463 A2 * | 1/2007 | ......... G01R 33/3403 |

OTHER PUBLICATIONS

Frans, Yohan, et al., "A 56-GB/s PAM4 Wireline Transceiver Using a 32-Way Time-Interleaved SAR ADC in 16-nm FinFET", IEEE Journal of Solid-State Circuits, vol. 52, No. 4, Apr. 2017.
Pisati, Matteo, et al., "A 243-mW 1.25-56-GB/s Continuous Range PAM-4 42.5-dB IL ADC/DAC-Based Transceiver in 7-nm FinFET", IEEE Journal of Solid-State Circuits, vol. 55, No. 1, Jan. 2020.

(Continued)

*Primary Examiner* — Freshteh N Aghdam
(74) *Attorney, Agent, or Firm* — Patterson + Sheridan, LLP

(57) ABSTRACT

Some examples described herein provide for an integrated circuit including a continuous time linear equalizer (CTLE) circuit and a method of operating the integrated circuit. In an example, an integrated circuit includes a transconductance amplifier stage and a transimpedance amplifier stage. The transconductance amplifier stage has a first input node and a first output node. The transconductance amplifier stage includes a first complementary device inverter. The transimpedance amplifier stage has a second input node and a second output node. The first output node is electrically connected to the second input node. The transimpedance amplifier stage includes a second complementary device inverter.

17 Claims, 12 Drawing Sheets

(56) References Cited

OTHER PUBLICATIONS

Zheng, Kevin, et al., "An Inverter-Based Analog Front-End for a 56-Gb/s PAM-4 Wireline Transceiver in 16-nm CMOS", IEEE Solid-State Circuits Letters, vol. 1, No. 12, Dec. 2018.
Cherry, E. M., et al., "The design of wide-band transistor feedback amplifiers", Proceedings of the Institution of Electrical Engineers, vol. 110, Iss, 2, Feb. 1963.
Holdenried, Chris D., et al., "Analysis and Design of HBT Cherry-Hooper Amplifiers With Emitter-Follower Feedback for Optical Communications", IEEE Journal of Solid-State Circuits, vol. 39, No. 11, Nov. 2004.

\* cited by examiner

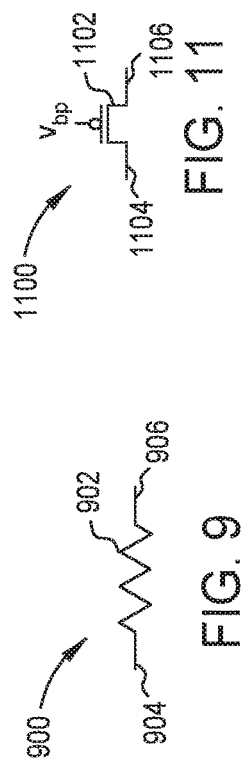
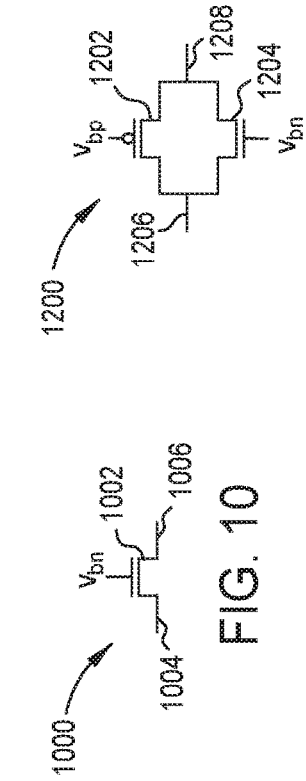
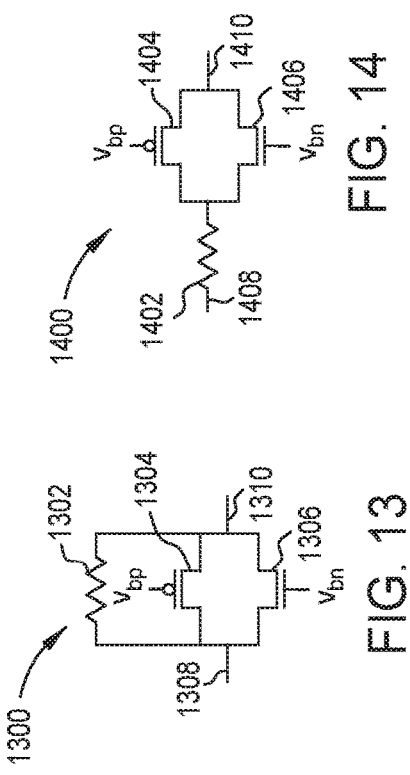
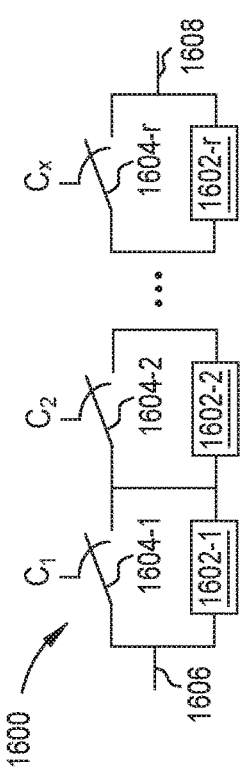
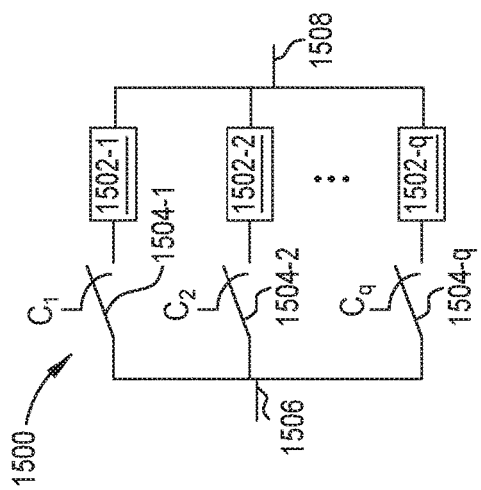

US 11,489,705 B1

INTEGRATED CIRCUIT INCLUDING A CONTINUOUS TIME LINEAR EQUALIZER (CTLE) CIRCUIT AND METHOD OF OPERATION

TECHNICAL FIELD

Examples of the present disclosure generally relate to an integrated circuit including a continuous time linear equalizer (CTLE) circuit and a method of operating the integrated circuit.

BACKGROUND

High-speed serial communication can be an important function in many communication systems. A continuous time linear equalizer (CTLE) circuit may be implemented for high-speed serial link communications. A CTLE circuit can perform equalization by properly shaping magnitudes of signals at various frequencies. A communication channel can have a response based on the frequency of the signal communicated therethrough. For example, a communication channel can attenuate a signal at high frequencies. This frequency response of the communication channel may be a natural limitation of the communication channel. A CTLE circuit can accommodate the attenuation by increasing a magnitude of the signal (e.g., by increasing a gain of the CTLE circuit) at those high frequencies. A CTLE circuit is generally implemented to equalize a signal by creating a uniform frequency response (e.g., uniform gain) throughout a target frequency range from the source of the signal to the destination of the signal.

SUMMARY

Some examples described herein provide for an integrated circuit including a continuous time linear equalizer (CTLE) circuit and a method of operating the integrated circuit. Some CTLE circuits implemented as described herein can be compact, can operate at a low voltage, can be high speed, and/or can have a high bandwidth. Further, some examples implement CTLE circuits that are programmable, which can add a degree of flexibility.

An example of the present disclosure is an integrated circuit. The integrated circuit includes a first transconductance amplifier stage and a first transimpedance amplifier stage. The first transconductance amplifier stage has a first input node and a first output node. The first transconductance amplifier stage includes a first complementary device inverter. The first transimpedance amplifier stage has a second input node and a second output node. The first output node is electrically connected to the second input node. The first transimpedance amplifier stage includes a second complementary device inverter.

Another example of the present disclosure is an integrated circuit. The integrated circuit includes a continuous time linear equalizer circuit. The continuous time linear equalizer circuit includes a transconductance amplifier stage and a transimpedance amplifier stage. The transconductance amplifier stage has a first input node and a first output node. The transconductance amplifier stage includes a first path and a second path. The first path includes a first complementary device inverter electrically connected between the first input node and the first output node. The second path includes a second complementary device inverter and a first impedance circuit. The second complementary device inverter and the first impedance circuit are electrically connected between the first input node and the first output node. The transimpedance amplifier stage has a second input node and a second output node. The first output node is electrically connected to the second input node. The transimpedance amplifier stage includes a third complementary device inverter electrically connected between the second input node and the second output node.

Another example of the present disclosure is a method for operating an integrated circuit. An input voltage input to a transconductance amplifier stage is converted, by the transconductance amplifier stage, to a current output from the transconductance amplifier stage. The transconductance amplifier stage includes a first complementary device inverter. The current, which is input to a transimpedance amplifier stage, is converted, by the transimpedance amplifier stage, to an output voltage output from the transimpedance amplifier stage. The transimpedance amplifier stage includes a second complementary device inverter.

These and other aspects may be understood with reference to the following detailed description.

BRIEF DESCRIPTION OF THE DRAWINGS

So that the manner in which the above-recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 9, 10, 11, 12, 13, and 14 are circuit schematics of example resistive elements according to some examples.

FIGS. 15 and 16 are circuit schematics of impedance arrays according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
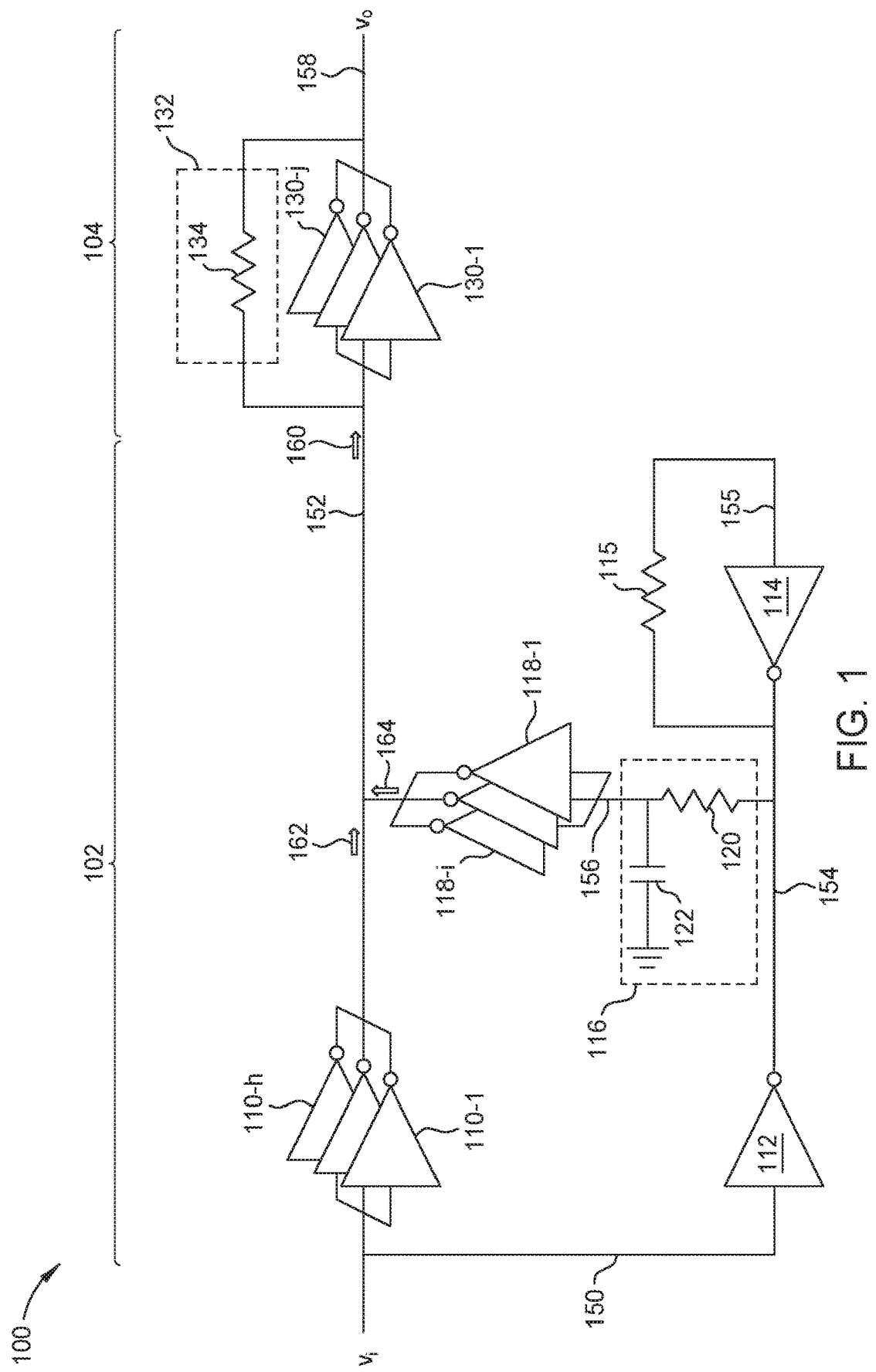
FIG. 1 is a circuit schematic of a continuous time linear equalizer (CTLE) circuit according to some examples.

Some examples described herein provide for an integrated circuit including a continuous time linear equalizer (CTLE) circuit and a method of operating the integrated circuit. In some examples, a CTLE circuit includes a transconductance amplifier stage and a transimpedance amplifier stage. The transconductance amplifier stage and the transimpedance amplifier stage can be serially connected. The transconductance amplifier stage and the transimpedance amplifier stage can each include one or more complementary device inverters (e.g., complementary metal-oxide-semiconductor (CMOS) inverters). Some CTLE circuits implemented as described herein can be compact, can operate at a low voltage, can be high speed, and/or can have a high bandwidth. Further, some examples implement CTLE circuits that are programmable, which can add a degree of flexibility.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

In the description that follows, various signals (e.g., voltages and/or currents) are described in the context of the operation of various circuits. A described signal indicates a corresponding node on which the signal is propagated and further indicates nodes that are communicatively coupled and/or electrically connected. For example, description of a signal output from a first circuit and input to a second circuit indicates an output node of the first circuit (on which the signal is output from the first circuit) is communicatively coupled and/or electrically connected to an input node of the second circuit (on which the signal is input to the second circuit). Explicit description of such nodes may be omitted in the following description, but a person having ordinary skill in the art will readily understand the presence of the nodes.

FIG. 1 is a circuit schematic of a continuous time linear equalizer (CTLE) circuit 100 according to some examples. The CTLE circuit 100 includes a transconductance amplifier (GM) stage 102 and a transimpedance amplifier (TIA) stage 104.

The transconductance amplifier stage 102 includes a primary path and a feed forward path. The transconductance amplifier stage 102 includes one or more inverters 110-1 to 110-*h* (collectively or individually, inverter(s) 110) in the primary path, and includes an inverter 112, an inverter 114, a resistor 115, an impedance circuit 116, and one or more inverters 118-1 to 118-*i* (collectively or individually, inverter(s) 118) in the feed forward path. The impedance circuit 116 includes a resistor 120 and a capacitor 122 as a simple example. The transimpedance amplifier stage 104 includes one or more inverters 130-1 to 130-*j* (collectively or individually, inverter(s) 130) and an impedance circuit 132. The impedance circuit 132 includes a resistor 134 as a simple example.

Each inverter 110 (whether one is implemented or multiple are implemented) has an input node electrically connected to an input voltage ($v_i$) node 150 and has an output node electrically connected to an intermediate node 152. The input voltage ($v_i$) node 150 can function as an input node of the transconductance amplifier stage 102. If multiple inverters 110 are implemented, the inverters 110 are electrically connected in parallel. The intermediate node 152 can be an output node of the transconductance amplifier stage 102 and an input node of the transimpedance amplifier stage 104.

The inverter 112 has an input node electrically connected to the input voltage ($v_i$) node 150 and has an output node electrically connected to a first feed forward path node 154. In the illustrated example, the inverter 114 has an output node electrically connected to the first feed forward path node 154, and a first terminal of the resistor 115 is electrically connected to the first feed forward path node 154. A second terminal of the resistor 115 (opposite from the first terminal) is electrically connected to an input node 155 of the inverter 114. In some examples, the resistor 115 can be omitted, and the input node and output node of the inverter 114 can each be electrically connected to the first feed forward path node 154. The impedance circuit 116 has a first terminal electrically connected to the first feed forward path node 154. Hence, in the illustrated example, the output node of the inverter 112, the output node of the inverter 114, the first terminal of the resistor 115, and the first terminal of the impedance circuit 116 are electrically connected together at the first feed forward path node 154.

A second terminal of the impedance circuit 116 is electrically connected to a second feed forward path node 156. In the illustrated example, the resistor 120 has a first terminal that is the first terminal of the impedance circuit 116, which is electrically connected to the first feed forward path node 154. A second terminal of the resistor 120 (opposite from the first terminal of the resistor 120) is electrically connected to a first terminal of the capacitor 122, which together form the second terminal of the impedance circuit 116 that is electrically connected to the second feed forward path node 156. A second terminal of the capacitor 122 (opposite from the first terminal of the capacitor 122) is electrically connected to a ground node. The resistor 120 and capacitor 122 are shown for illustration purposes. Any impedance circuit can be implemented to obtain a desired frequency response. In some examples, the impedance circuit 116 can include a combination of a number of resistors, a number of capacitors, and/or a number of inductors. Any impedance, such as a result of the resistance of the resistor 120 and/or capacitance of the capacitor 122, can be and/or include an explicitly formed component in the circuit, or can be and/or include a parasitic impedance in the circuit.

The second feed forward path node 156 is further electrically connected to respective input nodes of the one or more inverters 118. Respective output nodes of the one or more inverters 118 are electrically connected to the intermediate node 152. Hence, if multiple inverters 118 are implemented, the inverters 118 are electrically connected in parallel.

In the transimpedance amplifier stage 104, each inverter 130 (whether one is implemented or multiple are implemented) has an input node electrically connected to the intermediate node 152 and has an output node electrically connected to an output voltage ($v_o$) node 158. The output voltage ($v_o$) node 158 can function as an output node of the transimpedance amplifier stage 104, and hence, as an output node of the CTLE circuit 100. If multiple inverters 130 are implemented, the inverters 130 are electrically connected in parallel.

A first terminal of the impedance circuit 132 is electrically connected to the intermediate node 152. A second terminal of the impedance circuit 132 is electrically connected to the output voltage ($v_o$) node 158. In the illustrated example, the resistor 134 has a first terminal that is the first terminal of the impedance circuit 132, which is electrically connected to the intermediate node 152. A second terminal of the resistor 134 (opposite from the first terminal of the resistor 134) is the second terminal of the impedance circuit 132 and is electrically connected to the output voltage ($v_o$) node 158. The resistor 134 is shown for illustration purposes. Any impedance circuit can be implemented to obtain a desired frequency response. In some examples, the impedance circuit 132 can include a combination of a number of resistors, a number of capacitors, and/or a number of inductors. In some examples, the impedance circuit 132 can include any of those components, such as a capacitor, electrically connected between the output voltage ($v_o$) node 158 and a ground node. Any impedance can be and/or include an explicitly formed component in the circuit, or can be and/or include a parasitic impedance in the circuit.

In some examples, any or each of the inverters 110, 112, 114, 118 are complementary device inverters, such as CMOS inverters. In some examples, any or each of the inverters 130 are complementary device inverters, such as CMOS inverters.

In some examples, any or each of the components of the CTLE circuit 100 are programmable. Programmability of any component can be implemented by a device, like a switch such as a transistor, that selectively electrically connects the respective component in the CTLE circuit 100, and/or can be implemented by tuning or biasing the respective component to implement a desired frequency response and/or have a desired electrical characteristic (e.g., response, impedance, conductance, etc.). Various examples of programmable components are described below. Programmability of any component(s) can permit the CTLE circuit 100 to be dynamically tunable to achieve a desired frequency response.

In operation, the transconductance amplifier stage 102 converts an input voltage ($v_i$) on the input voltage ($v_i$) node 150 to a current 160 that is output from the transconductance amplifier stage 102 and input into the transimpedance amplifier stage 104. The transimpedance amplifier stage 104 converts the current 160 to an output voltage ($v_o$) output on the output voltage ($v_o$) node 158. The primary path of the transconductance amplifier stage 102 converts the input voltage ($v_i$) on the input voltage ($v_i$) node 150 to a primary path current 162, and the feed forward path of the transconductance amplifier stage 102 converts the input voltage ($v_i$) on the input voltage ($v_i$) node 150 to a feed forward path current 164. The primary path current 162 and the feed forward path current 164 sum to form the current 160.

The feed forward path is configured such that the magnitude of the feed forward path current 164 from the feed forward path is subtracted from the primary path current 162 from the primary path. Hence, the transconductance amplifier stage 102 may be referred to as having subtractive feed forward. In the illustrated example, the impedance circuit 116 is configured as a low-pass filter. Hence, in the illustrated example and assuming a same magnitude of an input voltage ($v_i$) across relevant frequencies, the magnitude of the feed forward path current 164 can generally be greater at lower frequencies (e.g., from DC (e.g., 0 Hz) to the 3 dB roll off frequency of the impedance circuit 116) and can generally be lower at higher frequencies (e.g., greater than the 3 dB roll off frequency of the impedance circuit 116). Accordingly, in such example, the feed forward path can cause a greater magnitude of current to be subtracted from the primary path current 162 at lower frequencies to generate the current 160, while causing a lower magnitude of current to be subtracted from the primary path current 162 at higher frequencies. In such examples, a magnitude of the current 160 can be lower at low frequencies and higher at high frequencies, which can cause peaking of the current 160 at higher frequencies. Generally, the gain of the frequency response of the transconductance amplifier stage 102 in this example can be greater at higher frequencies (e.g., peak at those higher frequencies) and can be lower at lower frequencies.

The frequency responses of the inverters 110, 112, 114, 118 can also affect the current 160. In various examples, the frequency response of the impedance circuit 116 can dominate the frequency response of the transconductance amplifier stage 102, while in other examples, one or more of the inverters 110, 112, 114, 118 can dominate the frequency response of the transconductance amplifier stage 102. In further examples, both the inverters 110, 112, 114, 118 and the impedance circuit 116 can be significant contributors to the frequency response. The programmability of any of the inverters 110, 112, 114, 118 can be used to implement different frequency responses of the respective inverter(s). Additionally, any other circuit configuration can be implemented for the impedance circuit 116 to achieve a desired frequency response. In some examples, the impedance circuit 116 can be configured as or including a low-pass filter, a high-pass filter, a notch filter, a band-pass filter, or the like. Any filter can have any combination of poles and/or zeros in its transfer function.

Figure 2:
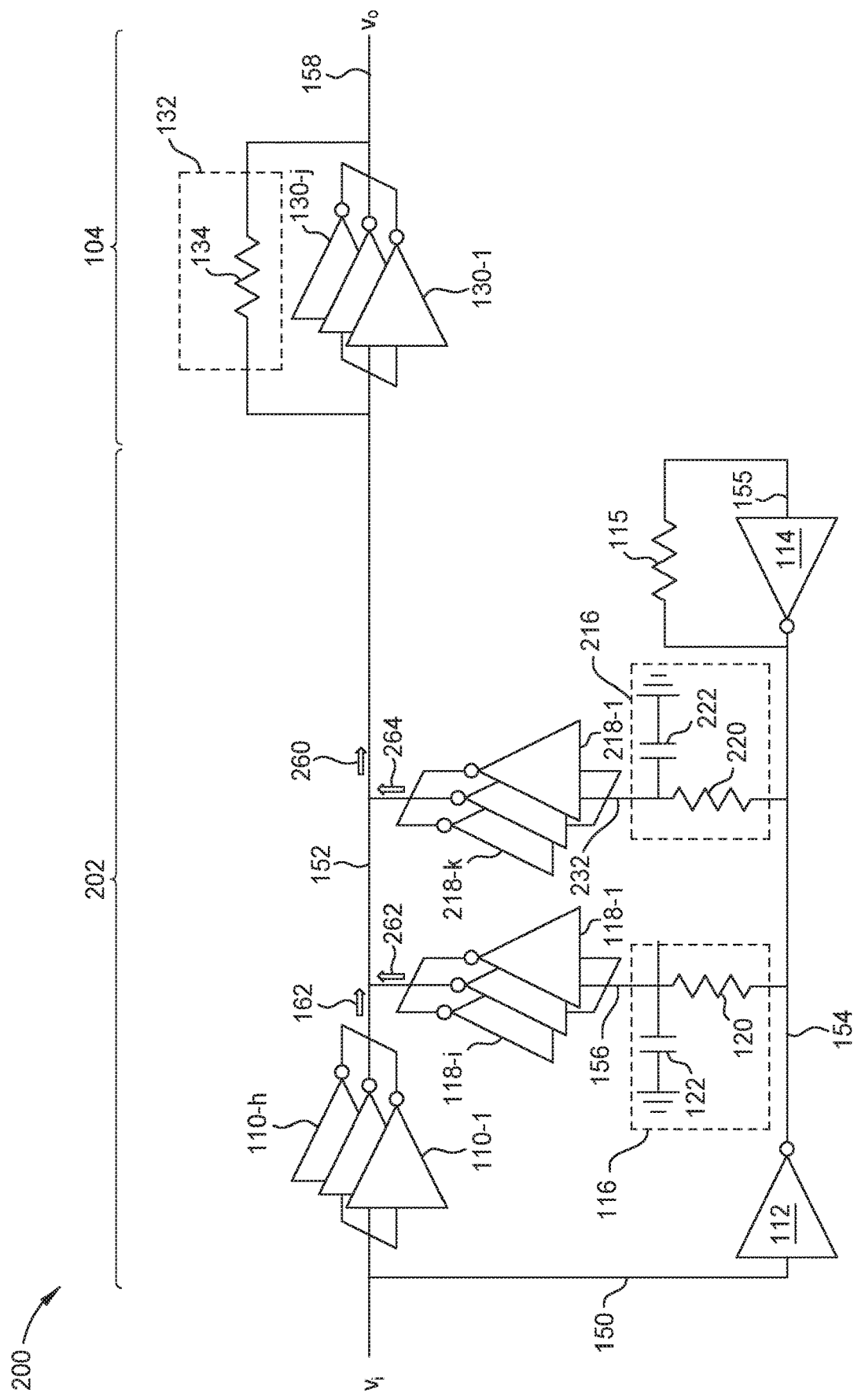
FIG. 2 is a circuit schematic of another CTLE circuit according to some examples.

FIG. 2 is a circuit schematic of another CTLE circuit 200 according to some examples. The CTLE circuit 200 includes a transconductance amplifier stage 202 and the transimpedance amplifier stage 104. The transconductance amplifier stage 202 of FIG. 2 is similar to the transconductance amplifier stage 102 of FIG. 1 but with forked branches in the feed forward path. Two branches in the feed forward path are illustrated in FIG. 2 and described below. In other examples, any number of branches can be implemented in a feed forward path. Description of elements common to both FIG. 1 and FIG. 2 is omitted here for brevity, and a person having ordinary skill in the art will readily understand the applicability of such description to FIG. 2 upon viewing FIG. 2.

A first branch of the feed forward path of the transconductance amplifier stage 202 includes the impedance circuit 116 and inverter(s) 118 electrically connected between the first feed forward path node 154 and the intermediate node 152 like described above with respect to FIG. 1. A second branch of the feed forward path of the transconductance amplifier stage 202 includes an impedance circuit 216 and one or more inverters 218-1 to 218-$k$ (collectively or individually, inverter(s) 218). The impedance circuit 216 includes a resistor 220 and a capacitor 222 as a simple example.

The impedance circuit 216 has a first terminal electrically connected to the first feed forward path node 154. Hence, in the illustrated example, the output node of the inverter 112, the output node of the inverter 114, the first terminal of the resistor 115, the first terminal of the impedance circuit 116, and the first terminal of the impedance circuit 216 are electrically connected together at the first feed forward path node 154. A second terminal of the impedance circuit 116 is electrically connected to a third feed forward path node 232. In the illustrated example, the resistor 220 has a first terminal that is the first terminal of the impedance circuit 216, which is electrically connected to the first feed forward path node 154. A second terminal of the resistor 220 (opposite from the first terminal of the resistor 220) is electrically connected to a first terminal of the capacitor 222, which together form the second terminal of the impedance circuit 216 that is electrically connected to the third feed forward path node 232. A second terminal of the capacitor 222 (opposite from the first terminal of the capacitor 222) is electrically connected to a ground node. The resistor 220 and capacitor 222 are shown for illustration purposes. Any impedance circuit can be implemented to obtain a desired frequency response. In some examples, the impedance circuit 216 can include a combination of a number of resistors, a number of capacitors, and/or a number of inductors. Any impedance, such as a result of the resistance of the resistor 220 and/or capacitance of the capacitor 222, can be and/or include an explicitly formed component in the circuit, or can be and/or include a parasitic impedance in the circuit.

The third feed forward path node 232 is further electrically connected to respective input nodes of the one or more inverters 218. Respective output nodes of the one or more inverters 218 are electrically connected to the intermediate node 152. Hence, if multiple inverters 218 are implemented, the inverters 218 are electrically connected in parallel.

In some examples, any or each of the inverters 110, 112, 114, 118, 218 are complementary device inverters, such as CMOS inverters. In some examples, any or each of the inverters 130 are complementary device inverters, such as CMOS inverters.

In some examples, any or each of the components of the CTLE circuit 200 are programmable like described above with respect to FIG. 1. Programmability of any component(s) can permit the CTLE circuit 200 to be dynamically tunable to achieve a desired frequency response.

In operation, the transconductance amplifier stage 202 converts an input voltage ($v_i$) on the input voltage ($v_i$) node 150 to a current 260 that is output from the transconductance amplifier stage 202 and input into the transimpedance amplifier stage 104. The transimpedance amplifier stage 104 converts the current 260 to an output voltage ($v_o$) output on the output voltage ($v_o$) node 158. The primary path of the transconductance amplifier stage 202 converts the input voltage ($v_i$) on the input voltage ($v_i$) node 150 to a primary path current 162. The first branch of the feed forward path of the transconductance amplifier stage 202 converts the input voltage ($v_i$) on the input voltage ($v_i$) node 150 to a first branch feed forward path current 262, and the second branch of the feed forward path of the transconductance amplifier stage 202 converts the input voltage ($v_i$) on the input voltage ($v_i$) node 150 to a second branch feed forward path current 264. The primary path current 162, the first branch feed forward path current 262, and the second branch feed forward path current 264 sum to form the current 260.

The feed forward path is configured such that the respective magnitudes of the first branch feed forward path current 262 and the second branch feed forward path current 264 from the feed forward path are subtracted from the primary path current 162 from the primary path. In the illustrated example, each of the impedance circuits 116, 216 is configured as a low-pass filter. The impedance circuits 116, 216 can be configured to provide different frequency responses that generate the first branch feed forward path current 262 and the second branch feed forward path current 264. The branches, and the respective currents that are generated, can operate like described above with respect to FIG. 1. The responses of the first branch and the second branch can depend on the response of the inverters 112, 114 since both branches are electrically connected to the first feed forward path node 154.

Like previously described, the frequency responses of the inverters 110, 112, 114, 118, 218 can also affect the current 260. In various examples, the frequency response of the impedance circuits 116, 216 can dominate the frequency response of the transconductance amplifier stage 202, while in other examples, one or more of the inverters 110, 112, 114, 118, 218 can dominate the frequency response of the transconductance amplifier stage 202. The programmability of any of the inverters 110, 112, 114, 118, 218 can be used to implement different frequency responses of the respective inverter(s). Additionally, any other circuit configuration can be implemented for the impedance circuits 116, 216 to achieve a desired frequency response. In some examples, each of the impedance circuits 116, 216 can be configured as or including a low-pass filter, a high-pass filter, a notch filter, a band-pass filter, or the like. Any filter can have any combination of poles and/or zeros in its transfer function.

Figure 3:
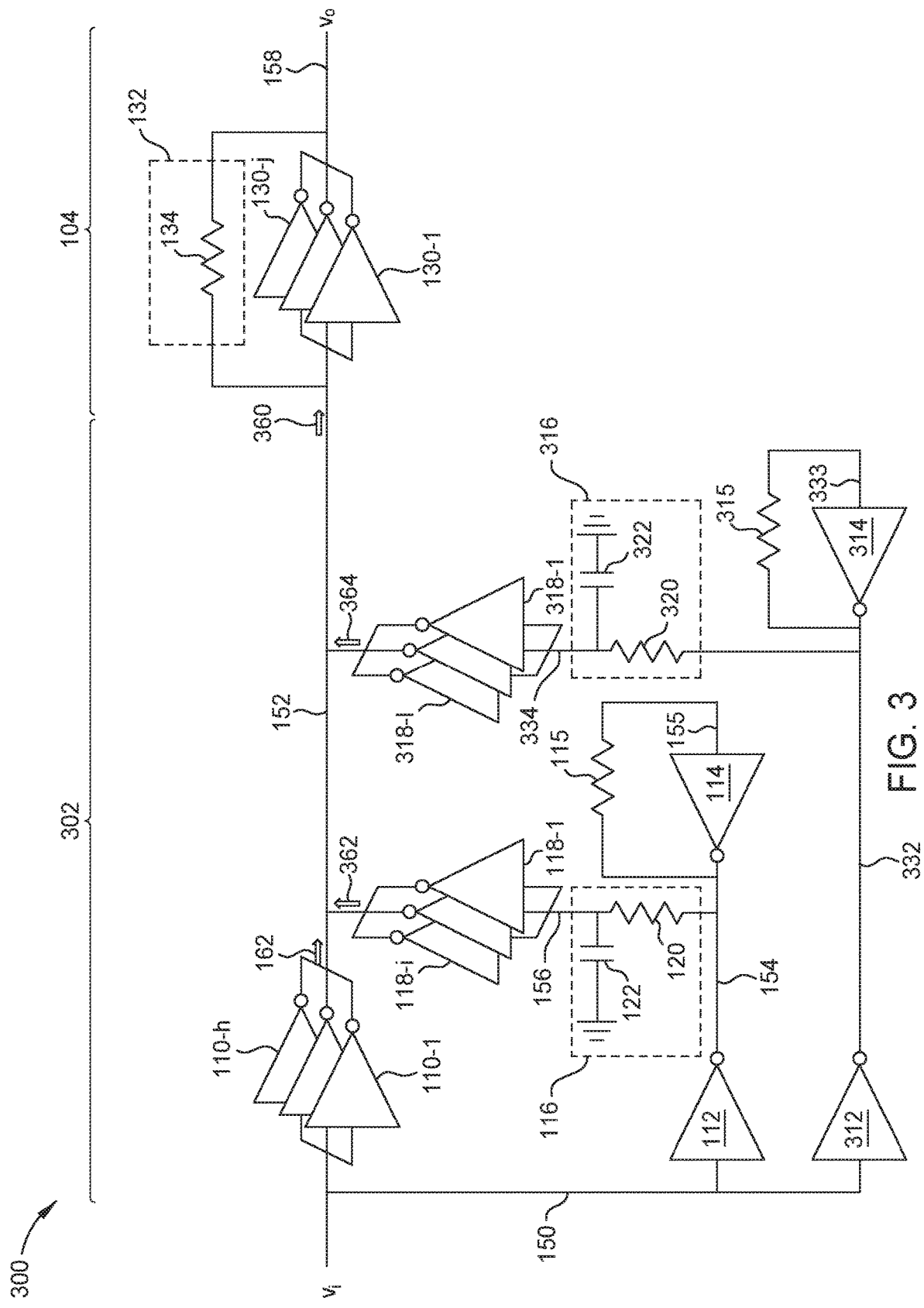
FIG. 3 is a circuit schematic of another CTLE circuit according to some examples.

FIG. 3 is a circuit schematic of another CTLE circuit 300 according to some examples. The CTLE circuit 300 includes a transconductance amplifier stage 302 and the transimpedance amplifier stage 104. The transconductance amplifier stage 302 of FIG. 3 is similar to the transconductance amplifier stage 102 of FIG. 1 but with multiple feed forward paths. Two feed forward paths are illustrated in FIG. 2 and described below. In other examples, any number of feed forward paths can be implemented. Additionally, any combination or number of branches in any feed forward path can be implemented. Description of elements common to both FIG. 1 and FIG. 3 is omitted here for brevity, and a person having ordinary skill in the art will readily understand the applicability of such description to FIG. 3 upon viewing FIG. 3.

The transconductance amplifier stage 302 further includes a second feed forward path. The transconductance amplifier stage 302 includes an inverter 312, an inverter 314, a resistor 315, an impedance circuit 316, and one or more inverters 318-1 to 318-*l* (collectively or individually, inverter(s) 318) in the second feed forward path. The impedance circuit 316 includes a resistor 320 and a capacitor 322 as a simple example.

The inverter 312 has an input node electrically connected to the input voltage ($v_i$) node 150 and has an output node electrically connected to a third feed forward path node 332. In the illustrated example, the inverter 314 has an output node electrically connected to the third feed forward path node 332, and a first terminal of the resistor 315 is electrically connected to the third feed forward path node 332. A second terminal of the resistor 315 (opposite from the first terminal) is electrically connected to an input node 333 of the inverter 314. In some examples, the resistor 315 can be omitted, and the input node and output node of the inverter 314 can each be electrically connected to the third feed forward path node 332. The impedance circuit 316 has a first terminal electrically connected to the third feed forward path node 332. Hence, in the illustrated example, the output node of the inverter 312, the output node of the inverter 314, the first terminal of the resistor 315, and the first terminal of the impedance circuit 316 are electrically connected together at the third feed forward path node 332.

A second terminal of the impedance circuit 316 is electrically connected to a fourth feed forward path node 334. In the illustrated example, the resistor 320 has a first terminal that is the first terminal of the impedance circuit 316, which is electrically connected to the third feed forward path node 332. A second terminal of the resistor 320 (opposite from the first terminal of the resistor 320) is electrically connected to a first terminal of the capacitor 322, which together form the second terminal of the impedance circuit 316 that is electrically connected to the fourth feed forward path node 334. A second terminal of the capacitor 322 (opposite from the first terminal of the capacitor 322) is electrically connected to a ground node. The resistor 320 and capacitor 322 are shown for illustration purposes. Any impedance circuit can be implemented to obtain a desired frequency response. In some examples, the impedance circuit 316 can include a combination of a number of resistors, a number of capacitors, and/or a number of inductors. Any impedance, such as a result of the resistance of the resistor 320 and/or capacitance of the capacitor 322, can be and/or include an explicitly formed component in the circuit, or can be and/or include a parasitic impedance in the circuit.

The fourth feed forward path node 334 is further electrically connected to respective input nodes of the one or more inverters 318. Respective output nodes of the one or more inverters 318 are electrically connected to the intermediate node 152. Hence, if multiple inverters 318 are implemented, the inverters 318 are electrically connected in parallel.

In some examples, any or each of the inverters 110, 112, 114, 118, 312, 314, 318 are complementary device inverters, such as CMOS inverters. In some examples, any or each of the inverters 130 are complementary device inverters, such as CMOS inverters.

In some examples, any or each of the components of the CTLE circuit 300 are programmable like described above with respect to FIG. 1. Programmability of any component(s) can permit the CTLE circuit 300 to be dynamically tunable to achieve a desired frequency response.

In operation, the transconductance amplifier stage 302 converts an input voltage ($v_i$) on the input voltage ($v_i$) node 150 to a current 360 that is output from the transconductance amplifier stage 302 and input into the transimpedance amplifier stage 104. The transimpedance amplifier stage 104 converts the current 360 to an output voltage ($v_o$) output on the output voltage ($v_o$) node 158. The primary path of the transconductance amplifier stage 302 converts the input voltage ($v_i$) on the input voltage ($v_i$) node 150 to a primary path current 162. The first feed forward path of the transconductance amplifier stage 302 converts the input voltage ($v_i$) on the input voltage ($v_i$) node 150 to a first feed forward path current 362, and the second feed forward path of the transconductance amplifier stage 302 converts the input voltage ($v_i$) on the input voltage ($v_i$) node 150 to a second feed forward path current 364. The primary path current 162, the first feed forward path current 362, and the second feed forward path current 364 sum to form the current 260.

The first and second feed forward paths are configured such that the respective magnitudes of the first feed forward path current 362 from the first feed forward path (e.g., including the inverters 112, 114, 118 and impedance circuit 116) and the second feed forward path current 364 from the second feed forward path are subtracted from the primary path current 162 from the primary path. In the illustrated example, each of the impedance circuits 116, 316 is configured as a low-pass filter. The impedance circuits 116, 316 can be configured to provide different frequency responses that generate the first feed forward path current 362 and the second feed forward path current 364. The first and second feed forward paths, and the respective currents that are generated, can operate like described above with respect to FIG. 1.

Like previously described, the frequency responses of the inverters 110, 112, 114, 118, 312, 314, 318 can also affect the current 360. More specifically, the frequency responses of the inverters 112, 114, 118 can affect the first feed forward path current 362, and the frequency responses of the inverters 312, 314, 318 can affect the second feed forward path current 364. The first feed forward path can have a response that is independent from the inverters 312, 314, and the second feed forward path can have a response that is independent from the inverters 112, 114. In various examples, the frequency response of the impedance circuits 116, 316 can dominate the frequency response of the transconductance amplifier stage 302, while in other examples, one or more of the inverters 110, 112, 114, 118, 312, 314, 318 can dominate the frequency response of the transconductance amplifier stage 302. The programmability of any of the inverters 110, 112, 114, 118, 312, 314, 318 can be used to implement different frequency responses of the respective inverter(s). Additionally, any other circuit configuration can be implemented for the impedance circuits 116, 316 to achieve a desired frequency response. In some examples, each of the impedance circuits 116, 316 can be configured as or including a low-pass filter, a high-pass filter, a notch filter, a band-pass filter, or the like. Any filter can have any combination of poles and/or zeros in its transfer function.

Figure 4:
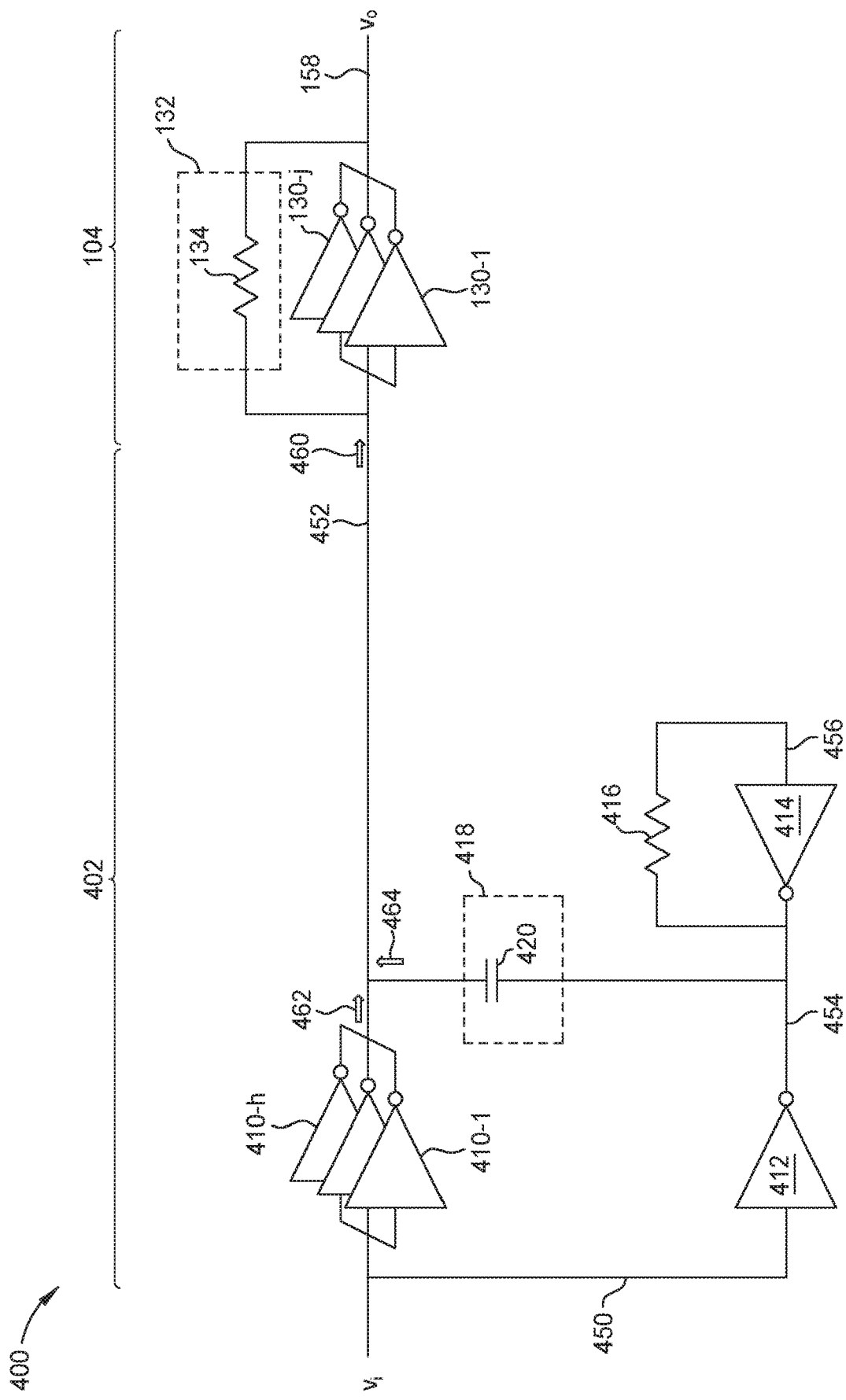
FIG. 4 is a circuit schematic of another CTLE circuit according to some examples.

FIG. 4 is a circuit schematic of a CTLE circuit 400 according to some examples. The CTLE circuit 400 includes a transconductance amplifier stage 402 and a transimpedance amplifier stage 104. The transimpedance amplifier stage 104 is like described above with respect to FIG. 1, and hence, description here of the transimpedance amplifier stage 104 is omitted.

The transconductance amplifier stage 402 includes a primary path and a feed forward path. The transconductance amplifier stage 402 includes one or more inverters 410-1 to 410-$h$ (collectively or individually, inverter(s) 410) in the primary path, and includes an inverter 412, an inverter 414, a resistor 416, and an impedance circuit 418 in the feed forward path. The impedance circuit 418 includes a capacitor 422 as a simple example.

Each inverter 410 (whether one is implemented or multiple are implemented) has an input node electrically connected to an input voltage ($v_i$) node 450 and has an output node electrically connected to an intermediate node 452. The input voltage ($v_i$) node 450 can function as an input node of the transconductance amplifier stage 402. If multiple inverters 410 are implemented, the inverters 410 are electrically connected in parallel. The intermediate node 452 can be an output node of the transconductance amplifier stage 402 and an input node of the transimpedance amplifier stage 104.

The inverter 412 has an input node electrically connected to the input voltage ($v_i$) node 450 and has an output node electrically connected to a first feed forward path node 454. The inverter 414 has an input node electrically connected to a second feed forward path node 456 and an output node electrically connected to the first feed forward path node 454. The resistor 416 has a first terminal electrically connected to the first feed forward path node 454 and has a second terminal electrically connected to the second feed forward path node 456. Hence, the resistor 416 is electrically connected between the input node and the output node of the inverter 414. The impedance circuit 418 has a first terminal electrically connected to the first feed forward path node 454. Hence, the output node of the inverter 412, the output node of the inverter 414, the first terminal of the resistor 416, and the first terminal of the impedance circuit 418 are electrically connected together at the first feed forward path node 454.

A second terminal of the impedance circuit 418 is electrically connected to the intermediate node 452. In the illustrated example, the capacitor 420 has a first terminal that is the first terminal of the impedance circuit 418, which is electrically connected to the first feed forward path node 454. A second terminal of the capacitor 420 (opposite from the first terminal of the capacitor 420) is the second terminal of the impedance circuit 418 that is electrically connected to the intermediate node 452. The capacitor 420 is shown for illustration purposes. The capacitor 420 can implement a high-pass filter. Any impedance circuit can be implemented to obtain a desired frequency response. In some examples, the impedance circuit 418 can include a combination of a number of resistors, a number of capacitors, and/or a number of inductors. Any impedance, such as a result of the capacitance of the capacitor 420, can be and/or include an explicitly formed component in the circuit, or can be and/or include a parasitic impedance in the circuit.

In some examples, any or each of the inverters 410, 412, 414 are complementary device inverters, such as CMOS inverters. In some examples, any or each of the inverters 130 are complementary device inverters, such as CMOS inverters.

In some examples, any or each of the components of the CTLE circuit 400 are programmable. Programmability of any component can be implemented by a device, like a switch such as a transistor, that selectively electrically connects the respective component in the CTLE circuit 400 and can be implemented by tuning or biasing the respective component to implement a desired frequency response and/or have a desired electrical characteristic (e.g., response, impedance, conductance, etc.). Various examples of programmable components are described below. Programmability of any component(s) can permit the CTLE circuit 400 to be dynamically tunable to achieve a desired frequency response.

In operation, the transconductance amplifier stage 402 converts an input voltage ($v_i$) on the input voltage ($v_i$) node 450 to a current 460 that is output from the transconductance amplifier stage 402 and input into the transimpedance amplifier stage 104. The transimpedance amplifier stage 104 converts the current 460 to an output voltage ($v_o$) output on the output voltage ($v_o$) node 158. The primary path of the transconductance amplifier stage 402 converts the input voltage ($v_i$) on the input voltage ($v_i$) node 450 to a primary path current 462, and the feed forward path of the transconductance amplifier stage 402 converts the input voltage ($v_i$) on the input voltage ($v_i$) node 450 to a feed forward path current 464. The primary path current 462 and the feed forward path current 464 sum to form the current 460.

The feed forward path is configured such that the magnitude of the feed forward path current 464 from the feed forward path is added to the primary path current 462 from the primary path. Hence, the transconductance amplifier stage 402 may be referred to as having additive feed forward. In the illustrated example, the impedance circuit 418 is configured as a high-pass filter. Hence, in the illustrated example and assuming a same magnitude of an input voltage ($v_i$) across relevant frequencies, the magnitude of the feed forward path current 464 can generally be greater at higher frequencies (e.g., greater than the 3 dB roll off frequency) and can generally be lower at lower frequencies (e.g., from DC (e.g., 0 Hz) to the 3 dB roll off frequency). Accordingly, in such example, the feed forward path can cause a greater magnitude of current to be added to the primary path current 462 at higher frequencies to generate the current 460, while causing a lower magnitude of current to be added to the primary path current 462 at lower frequencies. In such examples, the current 460 can be lower at low frequencies and higher at high frequencies, which can cause peaking of the current 460 at higher frequencies. Generally, the gain of the frequency response of the transconductance amplifier stage 402 in this example can be greater at higher frequencies (e.g., peak at those higher frequencies) and can be lower at lower frequencies.

The frequency responses of the inverters 410, 412, 414 can also affect the current 460. In various examples, the frequency response of the impedance circuit 418 can dominate the frequency response of the transconductance amplifier stage 402, while in other examples, one or more of the inverters 410, 412, 414 can dominate the frequency response of the transconductance amplifier stage 402. The programmability of any of the inverters 410, 412, 414 can be used to implement different frequency responses of the respective inverter(s). Additionally, any other circuit configuration can be implemented for the impedance circuit 418 to achieve a desired frequency response. In some examples, the impedance circuit 418 can be configured as or including a low-pass filter, a high-pass filter, a notch filter, a band-pass filter, or the like. Any filter can have any combination of poles and/or zeros in its transfer function.

Figure 5:
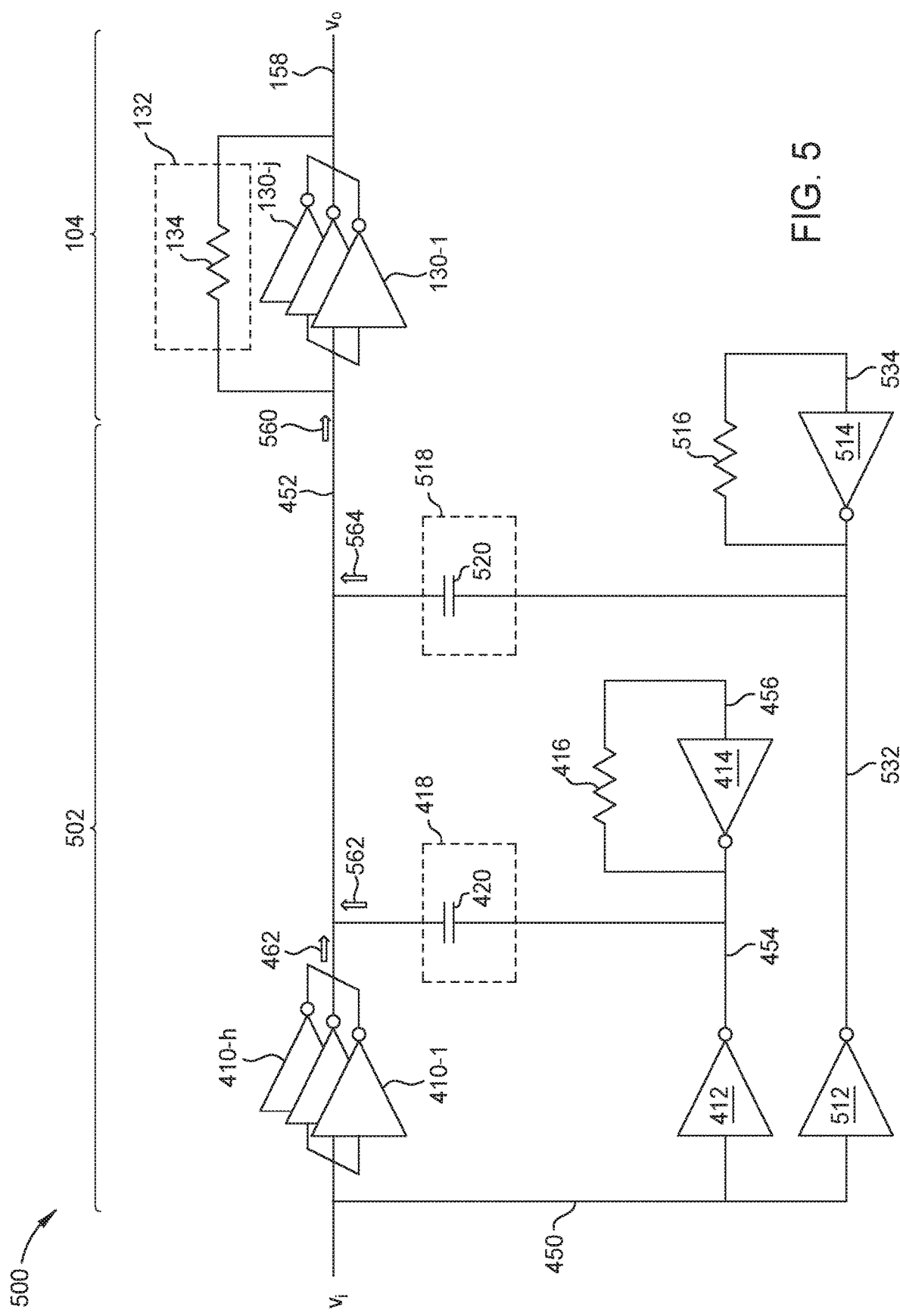
FIG. 5 is a circuit schematic of another CTLE circuit according to some examples.

FIG. 5 is a circuit schematic of another CTLE circuit 500 according to some examples. The CTLE circuit 500 includes a transconductance amplifier stage 502 and the transimpedance amplifier stage 104. The transconductance amplifier stage 502 of FIG. 5 is similar to the transconductance amplifier stage 402 of FIG. 4 but with multiple feed forward paths. Two feed forward paths are illustrated in FIG. 5 and described below. In other examples, any number of feed forward paths can be implemented. Description of elements common to both FIG. 4 and FIG. 5 is omitted here for brevity, and a person having ordinary skill in the art will readily understand the applicability of such description to FIG. 5 upon viewing FIG. 5.

The transconductance amplifier stage 502 further includes a second feed forward path. The transconductance amplifier stage 502 includes an inverter 512, an inverter 514, a resistor 516, and an impedance circuit 518 in the second feed forward path. The impedance circuit 518 includes a capacitor 520 as a simple example.

The inverter 512 has an input node electrically connected to the input voltage ($v_i$) node 450 and has an output node electrically connected to a third feed forward path node 532. The inverter 514 has an input node electrically connected to a fourth feed forward path node 534 and an output node electrically connected to the third feed forward path node 532. The resistor 516 has a first terminal electrically connected to the third feed forward path node 532 and has a second terminal electrically connected to the fourth feed forward path node 534. Hence, the resistor 516 is electrically connected between the input node and the output node of the inverter 514. The impedance circuit 518 has a first terminal electrically connected to the third feed forward path node 532. Hence, the output node of the inverter 512, the output node of the inverter 514, the first terminal of the resistor 516, and the first terminal of the impedance circuit 518 are electrically connected together at the third feed forward path node 532.

A second terminal of the impedance circuit 518 is electrically connected to the intermediate node 452. In the illustrated example, the capacitor 520 has a first terminal that is the first terminal of the impedance circuit 518, which is electrically connected to the third feed forward path node 532. A second terminal of the capacitor 520 (opposite from the first terminal of the capacitor 520) is the second terminal of the impedance circuit 518 that is electrically connected to the intermediate node 452. The capacitor 520 is shown for illustration purposes. Any impedance circuit can be implemented to obtain a desired frequency response. In some examples, the impedance circuit 518 can include a combination of a number of resistors, a number of capacitors, and/or a number of inductors. Any impedance, such as a result of the capacitance of the capacitor 520, can be and/or include an explicitly formed component in the circuit, or can be and/or include a parasitic impedance in the circuit.

In some examples, any or each of the inverters 410, 412, 414, 512, 514 are complementary device inverters, such as CMOS inverters. In some examples, any or each of the inverters 130 are complementary device inverters, such as CMOS inverters.

In some examples, any or each of the components of the CTLE circuit 500 are programmable like described above with respect to FIG. 4. Programmability of any component(s) can permit the CTLE circuit 500 to be dynamically tunable to achieve a desired frequency response.

In operation, the transconductance amplifier stage 502 converts an input voltage ($v_i$) on the input voltage ($v_i$) node 450 to a current 560 that is output from the transconductance amplifier stage 502 and input into the transimpedance amplifier stage 104. The transimpedance amplifier stage 104 converts the current 560 to an output voltage ($v_o$) output on the output voltage ($v_o$) node 158. The primary path of the transconductance amplifier stage 502 converts the input voltage ($v_i$) on the input voltage ($v_i$) node 450 to a primary path current 162. The first feed forward path of the transconductance amplifier stage 502 converts the input voltage ($v_i$) on the input voltage ($v_i$) node 450 to a first feed forward path current 562, and the second feed forward path of the transconductance amplifier stage 502 converts the input voltage ($v_i$) on the input voltage ($v_i$) node 450 to a second feed forward path current 564. The primary path current 462, the first feed forward path current 562, and the second feed forward path current 564 sum to form the current 560.

The first and second feed forward paths are configured such that the respective magnitudes of the first feed forward path current 562 from the first feed forward path (e.g., including the inverters 412, 414 and impedance circuit 418) and the second feed forward path current 564 from the second feed forward path are added to the primary path current 462 from the primary path. In the illustrated example, each of the impedance circuits 418, 518 is configured as a high-pass filter. The impedance circuits 418, 518 can be configured to provide different frequency responses that generate the first feed forward path current 562 and the second feed forward path current 564. The first and second feed forward paths, and the respective currents that are generated, can operate like described above with respect to FIG. 4.

Like previously described, the frequency responses of the inverters 410, 412, 414, 512, 514 can also affect the current 560. More specifically, the frequency responses of the inverters 412, 414 can affect the first feed forward path current 562, and the frequency responses of the inverters 512, 514 can affect the second feed forward path current 564. The first feed forward path can have a response that is independent from the inverters 512, 514, and the second feed forward path can have a response that is independent from the inverters 412, 414. In various examples, the frequency response of the impedance circuits 418, 518 can dominate the frequency response of the transconductance amplifier stage 502, while in other examples, one or more of the inverters 410, 412, 414, 512, 514 can dominate the frequency response of the transconductance amplifier stage 502. The programmability of any of the inverters 410, 412, 414, 512, 514 can be used to implement different frequency responses of the respective inverter(s). Additionally, any other circuit configuration can be implemented for the impedance circuits 418, 518 to achieve a desired frequency response. In some examples, each of the impedance circuits 418, 518 can be configured as or including a low-pass filter, a high-pass filter, a notch filter, a band-pass filter, or the like. Any filter can have any combination of poles and/or zeros in its transfer function.

Figure 6:
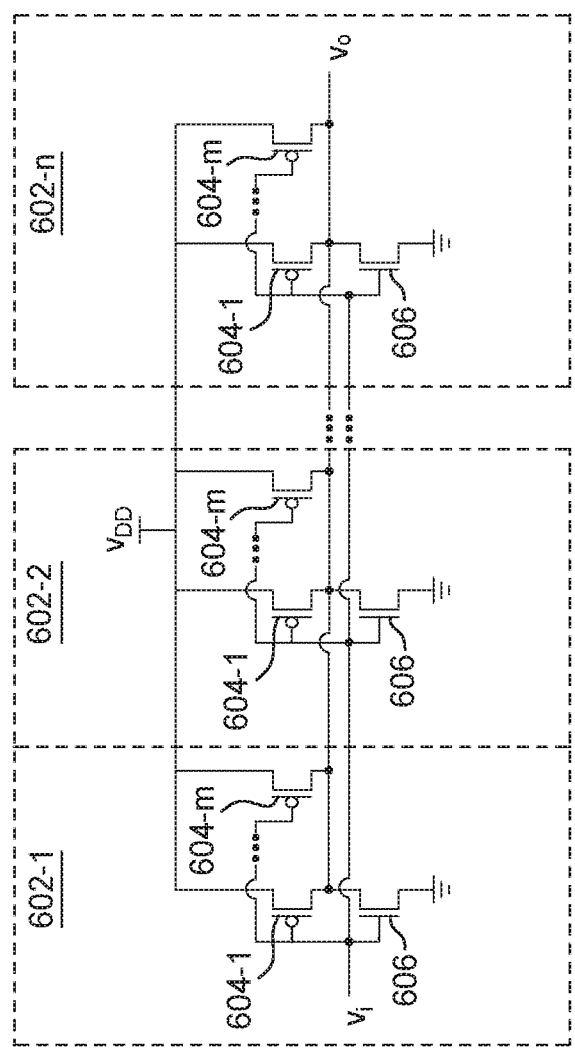
FIG. 6 is a circuit schematic of a number of parallel-connected complementary device inverters according to some examples.

FIG. 6 illustrates n number of parallel-connected complementary device (e.g., CMOS) inverters 602-1, 602-2, through 602-$n$ (collectively or individually, inverter(s) 602) according to some examples. An inverter 602 illustrated in FIG. 6 can be implemented for any inverter of the CTLE circuits of FIGS. 1-5. As noted above, a single inverter 602 can be implemented in various instances without being electrically connected in parallel. The n number of inverters 602 are shown for the purpose of illustrating possible parallel connections. Each inverter 602 in FIG. 6 is not programmable.

An inverter 602 includes m number of p-type transistors 604-1 to 604-$m$ (e.g., p-type fin field effect transistors (FinFETs)) and an n-type transistor 606 (e.g., an n-type FinFET). As illustrated, a ratio of p-type transistors 604 to n-type transistors 606 is m:1. Other examples contemplate any ratio. For example, an example contemplates an inverter 602 having one p-type transistor 604 and one n-type transistor 606 such that the ratio is 1:1. The ratio can be selected for an inverter 602, and a corresponding number of p-type and n-type transistors implemented in the inverter 602, to balance drivability between the p-type transistor(s) and the n-type transistor(s).

A respective gate node of the p-type transistor 604 is electrically connected to an input voltage ($v_i$) node. A respective source node of the p-type transistor 604 is electrically connected to a power supply voltage ($V_{DD}$) node, and a respective drain node of the p-type transistor 604 is electrically connected to an output voltage ($v_o$) node. Hence, the m number of p-type transistors 604 are electrically connected in parallel in an inverter 602. A gate node of the n-type transistor 606 is electrically connected to the input voltage ($v_i$) node. A drain node of the n-type transistor 606 is electrically connected to the output voltage ($v_o$) node, and a source node of the n-type transistor 606 is electrically connected to a ground node. A person of ordinary skill in the art will readily understand how additional n-type transistors 606 can be connected in parallel to achieve other ratios described above.

Figure 7:
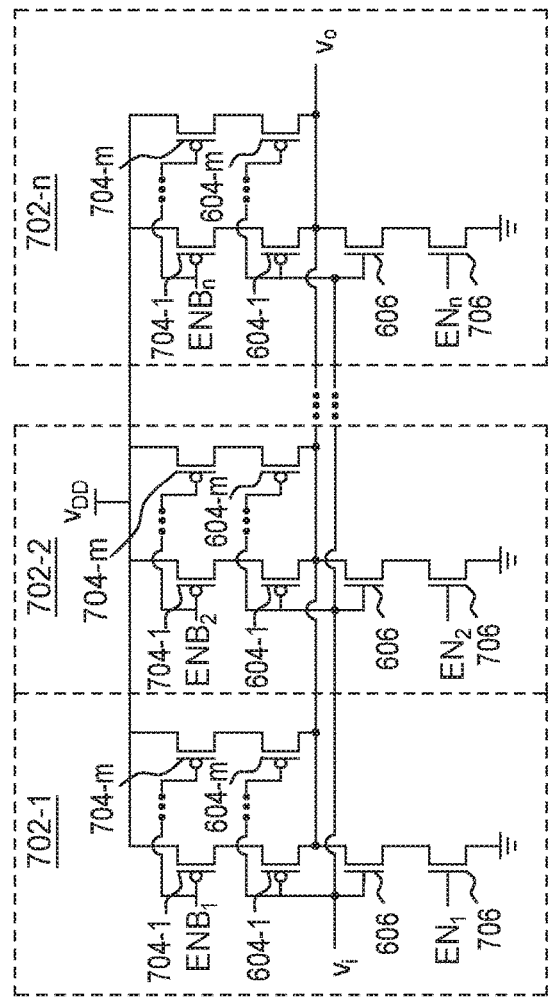
FIG. 7 is a circuit schematic of a number of parallel-connected complementary device inverters according to some examples.

FIG. 7 illustrates n number of parallel-connected complementary device (e.g., CMOS) inverters 702-1, 702-2, through 702-$n$ (collectively or individually, inverter(s) 702) according to some examples. An inverter 702 illustrated in FIG. 7 can be implemented for any inverter of the CTLE circuits of FIGS. 1-5. The n number of inverters 702 are shown for the purpose of illustrating possible parallel connections. Each inverter 702 in FIG. 7 is programmable. Each inverter 702 is programmable to selectively electrically connect or disconnect the p-type transistors 604 and n-type transistor 606 in the inverter 702 between the power supply voltage ($V_{DD}$) node and the ground node.

An inverter 702 includes the m number of p-type transistors 604 and the n-type transistor 606 generally as described above with respect to FIG. 6. The inverter 702 further includes m number of p-type transistors 704-1 to 704-m (e.g., p-type FinFETs) and an n-type transistor 706 (e.g., an n-type FinFET).

A respective source node of the p-type transistor 704 is electrically connected to the power supply voltage ($V_{DD}$) node, and a respective drain node of the p-type transistor 704 is electrically connected to a respective source node of a corresponding p-type transistor 604. Hence, each p-type transistor 604 in the inverter 702 has a corresponding p-type transistor 704 where the channels of the p-type transistors 604, 704 are electrically connected in series. A respective gate node of the p-type transistor 704 is electrically connected to a complementary enable signal ($ENB_x$) node of the inverter 702-x, where x identifies the corresponding inverter 702 in which the particular component is disposed or to which the particular signal is coupled (e.g., x is 1 for inverter 702-1) in this instance.

The source node of the n-type transistor 606 is electrically connected to a drain node of the n-type transistor 706, and a source node of the n-type transistor 706 is electrically connected to the ground node. Hence, the n-type transistor 606 in the inverter 702 has a corresponding n-type transistor 706 where the channels of the n-type transistors 606, 706 are electrically connected in series. A respective gate node of the n-type transistor 706 is electrically connected to an enable signal ($EN_x$) node of the inverter 702-x. The enable signal ($EN_x$) and the complementary enable signal ($ENB_x$) on the respective nodes of the inverter 702-x are logical complements of each other.

In operation, the enable signal ($EN_x$) can be a logical "1" or a logical "0", and the complementary enable signal ($ENB_x$) can be a complementary value. When the enable signal ($EN_x$) is a logical "1" and the complementary enable signal ($ENB_x$) is a logical "0", the p-type transistors 704 and n-type transistor 706 act as closed switches to electrically couple the p-type transistors 604 and n-type transistor 606 between the power supply voltage ($V_{DD}$) node and the ground node. In this state, the p-type transistors 604 and n-type transistor 606 are operational to provide or contribute to a response on the output voltage ($v_o$) node. When the enable signal ($EN_x$) is a logical "0" and the complementary enable signal ($ENB_x$) is a logical "1", the p-type transistors 704 and n-type transistor 706 act as open switches to electrically de-couple the p-type transistors 604 and n-type transistor 606 between the power supply voltage ($V_{DD}$) node and the ground node. In this state, the p-type transistors 604 and n-type transistor 606 do not provide or contribute to a response on the output voltage ($v_o$) node.

Hence, by selectively setting the enable signal ($EN_x$) for a given inverter 702-x, that inverter 702-x can contribute or provide a current weighting or impedance or frequency response based on an input signal input on the input voltage ($v_i$) node by outputting an output signal on the output voltage ($v_o$) node. Any combination or number of inverters 702 can have a respective enable signal set to provide any desired current weighting or impedance or frequency response.

In some examples, the state or value of an enable signal can be stored in a storage element, such as memory, a register, or the like. An output node of the storage element can be electrically coupled directly or through intermediate buffers and/or logic and/or voltage level-shifters to a respective gate node to provide the enable signal to the gate node. The output node of the storage element can also be electrically coupled to an input node of an inverter (e.g., like an inverter 602 in FIG. 6) that has an output node electrically coupled to a respective gate node to provide the complementary enable signal to the gate node.

Figure 8:
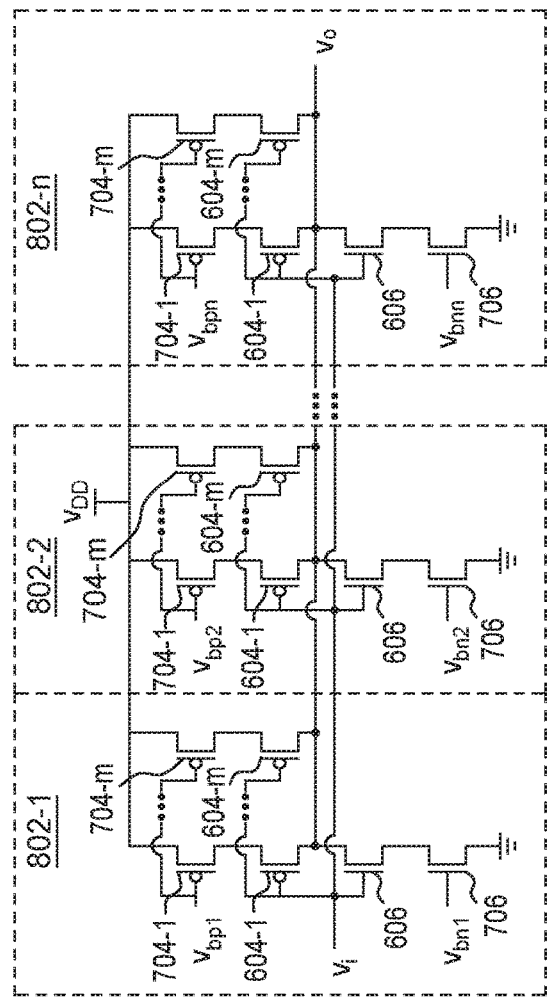
FIG. 8 is a circuit schematic of a number of parallel-connected complementary device inverters according to some examples.

FIG. 8 illustrates n number of parallel-connected complementary device (e.g., CMOS) inverters 802-1, 802-2, through 802-n (collectively or individually, inverter(s) 802) according to some examples. An inverter 802 illustrated in FIG. 8 can be implemented for any inverter of the CTLE circuits of FIGS. 1-5. The n number of inverters 802 are shown for the purpose of illustrating possible parallel connections. Each inverter 802 in FIG. 8 is programmable. Each inverter 802 is programmable to bias the p-type transistors 704 and n-type transistor 706 in the inverter 802.

An inverter 802 includes the m number of p-type transistors 604, 704 and the n-type transistor 606, 706 generally as described above with respect to FIGS. 6 and 7. A respective gate node of the p-type transistor 704 is electrically connected to a respective p-type device bias voltage ($v_{bpx}$) node of the inverter 802-x, where x identifies the corresponding inverter 802 in which the particular component is disposed or to which the particular signal is coupled (e.g., x is 1 for inverter 802-1) in this instance. A respective gate node of the n-type transistor 706 is electrically connected to a respective n-type device bias voltage ($v_{bnx}$) node of the inverter 802-x.

The bias voltages on the p-type device bias voltage ($v_{bpx}$) nodes and the n-type device bias voltage ($v_{bnx}$) node bias the inverter 802-x to have a desired current or impedance or response (e.g., a response output on the output voltage ($v_o$) node based on the input voltage input on the input voltage ($v_i$) node). Hence, by biasing a given inverter 802-x, that inverter 802-x can contribute or provide a desired current or impedance or frequency response based on an input signal input on the input voltage ($v_i$) node by outputting an output signal on the output voltage ($v_o$) node. Any combination or number of inverters 802 can be biased to provide any desired current or impedance or frequency response.

Additionally, when respective bias voltages are at a respective power rail (e.g., $V_{DD}$ or ground) to be a logical "1" or "0", the inverters 802 can be selectively electrically coupled or de-coupled between the power supply voltage ($V_{DD}$) node and the ground node, like described above with respect to FIG. 7.

In some examples, a digital value corresponding to a bias voltage can be stored in a storage element, such as memory, a register, or the like. An output node(s) of the storage element can be electrically coupled directly or through intermediate buffers and/or logic and/or voltage level-shifters to a digital-to-analog converter (DAC) that is configured to generate an analog bias voltage in response to the digital value stored in the storage element. An output node of the DAC can be electrically coupled to a respective gate node to provide the bias voltage to the gate node. Each bias voltage can likewise have a digital value stored in a storage element that causes a DAC to generate the respective bias voltage.

FIGS. 9 through 14 are circuit schematics of example resistive elements 900, 1000, 1100, 1200, 1300, 1400, respectively, according to some examples. For clarity, any bias node and bias voltage in FIGS. 9 through 14 can be independent and separate from any other bias node and bias voltage, e.g., implemented in an inverter, another programmable resistor, or other programmable element. The resistive element 900 of FIG. 9 includes a resistor 902 electrically connected between a first terminal 904 and a second terminal 906. The resistive element 900 is not programmable. The resistive element 1000 of FIG. 10 includes an n-type transistor 1002 having a source/drain node electrically connected to a first terminal 1004 and having another source/drain node electrically connected to a second terminal 1006. A gate node of the n-type transistor 1002 is electrically connected to a bias voltage ($v_{bn}$) node. The resistive element 1100 of FIG. 11 includes a p-type transistor 1102 having a source/drain node electrically connected to a first terminal 1104 and having another source/drain node electrically connected to a second terminal 1106. A gate node of the p-type transistor 1102 is electrically connected to a bias voltage ($v_{bp}$) node.

The resistive element 1200 of FIG. 12 includes a p-type transistor 1202 and an n-type transistor 1204. The p-type transistor 1202 has a source/drain node electrically connected to a first terminal 1206 and has another source/drain node electrically connected to a second terminal 1208. The n-type transistor 1204 has a source/drain node electrically connected to the first terminal 1206 and has another source/drain node electrically connected to the second terminal 1208. A gate node of the p-type transistor 1202 is electrically connected to a bias voltage ($v_{bp}$) node, and a gate node of the n-type transistor 1204 is electrically connected to a bias voltage ($v_{bn}$) node.

The resistive element 1300 of FIG. 13 includes a resistor 1302, a p-type transistor 1304, and an n-type transistor 1306. The resistor 1302 is electrically connected between a first terminal 1308 and a second terminal 1310. The p-type transistor 1304 has a source/drain node electrically connected to the first terminal 1308 and has another source/drain node electrically connected to the second terminal 1310. The n-type transistor 1306 has a source/drain node electrically connected to the first terminal 1308 and has another source/drain node electrically connected to the second terminal 1310. A gate node of the p-type transistor 1304 is electrically connected to a bias voltage ($v_{bp}$) node, and a gate node of the n-type transistor 1306 is electrically connected to a bias voltage ($v_{bn}$) node.

The resistive element 1400 of FIG. 14 includes a resistor 1402, a p-type transistor 1404, and an n-type transistor 1406. A first terminal of the resistor 1402 is electrically connected to a first terminal 1408 of the resistive element 1400. The p-type transistor 1404 has a source/drain node electrically connected to a second terminal of the resistor 1402 (opposite from the first terminal of the resistor 1402) and has another source/drain node electrically connected to a second terminal 1410 of the resistive element 1400. The n-type transistor 1406 has a source/drain node electrically connected to the second terminal of the resistor 1402 and has another source/drain node electrically connected to the second terminal 1410 of the resistive element 1400. A gate node of the p-type transistor 1404 is electrically connected to a bias voltage ($v_{bp}$) node, and a gate node of the n-type transistor 1406 is electrically connected to a bias voltage ($v_{bn}$) node.

The resistive elements 1000, 1100, 1200, 1300, 1400 can be programmable. For each of the bias voltage ($v_{bp}$, $v_{bn}$) nodes of the resistive elements 1000, 1100, 1200, 1300, 1400, a digital value corresponding to a bias voltage can be stored in a storage element, such as memory, a register, or the like. An output node(s) of the storage element can be electrically coupled to a DAC that is configured to generate an analog bias voltage in response to the digital value stored in the storage element. An output node of the DAC can be electrically coupled to the respective bias voltage node to provide the bias voltage. Hence, by writing a desired digital value to an appropriate storage element, the bias voltage can be programmable. The bias voltage on a bias voltage node can result in a corresponding resistance through the channel of the p-type or n-type transistor to which the bias voltage is applied. Accordingly, by writing a desired value to an appropriate storage element, the resistance of a resistive element can be programmatically set.

FIG. 15 is a circuit schematic of an impedance array 1500 according to some examples. The impedance array 1500 includes q number of impedance elements 1502-1, 1502-2 to 1502-$q$ (individually or collectively, impedance element(s) 1502) and q number of switches 1504-1, 1504-2 to 1504-$q$ (individually or collectively, switch(es) 1504). An impedance element 1502 is electrically connected in series with a corresponding switch 1504. The serially connected pairs of the impedance element 1502 and switch 1504 are electrically connected in parallel between a first terminal 1506 of the impedance array 1500 and a second terminal 1508 of the impedance array 1500.

Each switch 1504 further has a control ($C_x$) node. Each switch 1504 is configured to be selectively opened or closed based on a signal received at the control ($C_x$) node. Each switch 1504 can be a transistor (e.g., a p-type or n-type transistor), a transmission gate, or other switch. Each impedance element 1502 can be or include a resistive element (e.g., as shown in FIGS. 9-14), a capacitor, an inductor, or any combination or permutation thereof.

The impedance array 1500 is configured to selectively electrically connect or disconnect impedance elements in parallel based on the state (e.g., open or closed) of the switches 1504. The impedance array 1500 is programmable. In some examples, a control signal ($C_x$) can be stored in a storage element, such as memory, a register, or the like. An output node of the storage element can be electrically coupled to a respective control ($C_x$) node to provide the control signal ($C_x$) to the control ($C_x$) node to control the state of the corresponding switch 1504.

FIG. 16 is a circuit schematic of an impedance array 1600 according to some examples. The impedance array 1600 includes r number of impedance elements 1602-1, 1602-2 to 1602-$r$ (individually or collectively, impedance element(s) 1602) and r number of switches 1604-1, 1604-2 to 1604-$r$ (individually or collectively, switch(es) 1604). An impedance element 1602 is electrically connected in parallel with a corresponding switch 1604. The parallel-connected pairs of the impedance element 1602 and switch 1604 are electrically connected in series between a first terminal 1606 of the impedance array 1600 and a second terminal 1608 of the impedance array 1600.

Each switch 1504 further has a control ($C_x$) node. Each switch 1504 is configured to be selectively opened or closed based on a signal received at the control ($C_x$) node. Each switch 1504 can be a transistor (e.g., a p-type or n-type transistor), a transmission gate, or other switch. Each impedance element 1502 can be or include a resistive element (e.g., as shown in FIGS. 9-14), a capacitor, an inductor, or any combination or permutation thereof.

The impedance array 1600 is configured to selectively electrically connect or disconnect impedance elements in series based on the state (e.g., open or closed) of the switches 1604. When a switch 1604 is open, the corresponding impedance element 1602 of the parallel-connected pair is electrically coupled in series with any other impedance element in the impedance array 1600. When a switch 1604 is closed, the corresponding impedance element 1602 of the parallel-connected pair is electrically shorted and bypassed by the closed switch 1604, and hence, that impedance element 1602 is not coupled in series with any other impedance element in the impedance array 1600. The impedance array 1600 is programmable. In some examples, a control signal ($C_x$) can be stored in a storage element, such as memory, a register, or the like. An output node of the storage element can be electrically coupled to a respective control ($C_x$) node to provide the control signal ($C_x$) to the control ($C_x$) node to control the state of the corresponding switch 1604.

Any impedance circuit in a CTLE circuit, such as in FIGS. 1-5, can implement any resistive element and/or impedance array illustrated in and described with respect to FIGS. 9-16.

Figure 17:
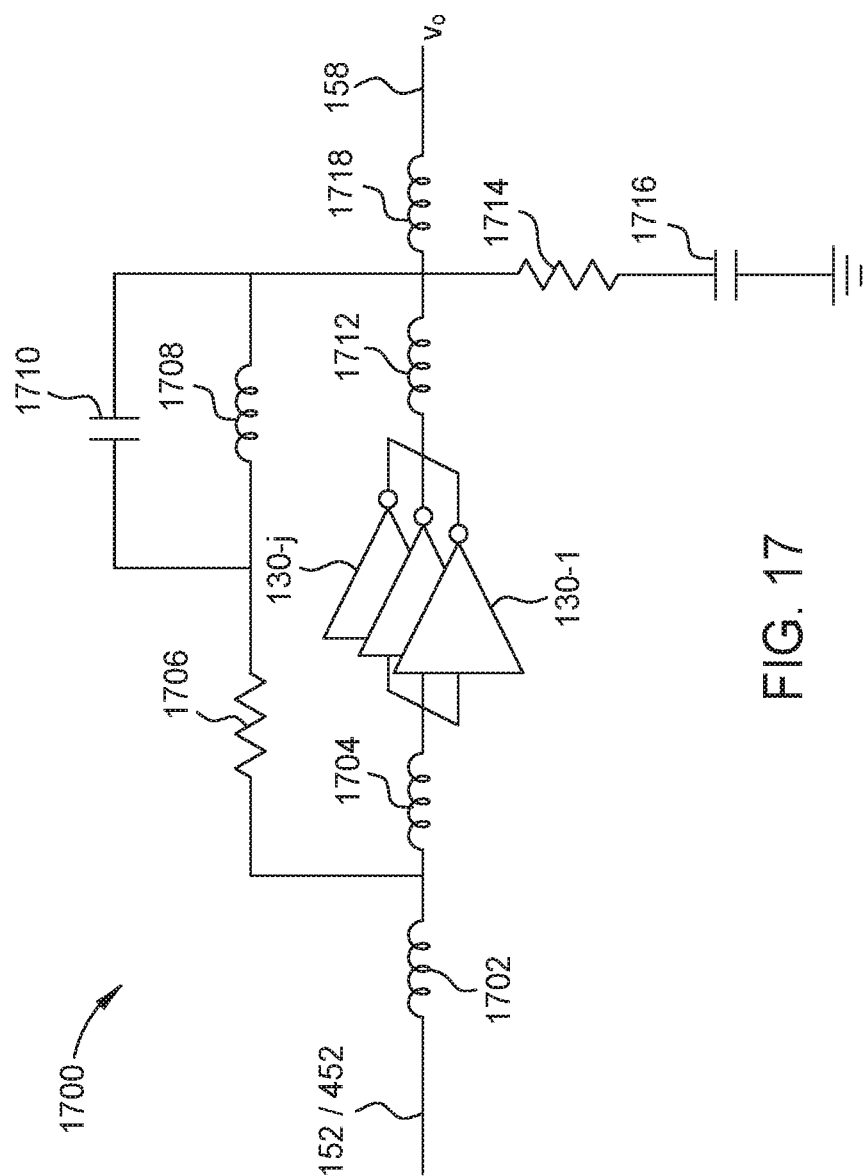
FIG. 17 is a circuit schematic of a transimpedance amplifier stage according to some examples.

FIG. 17 is a circuit schematic of a transimpedance amplifier stage 1700 according to some examples. The transimpedance amplifier stage 1700 is a modification of the transimpedance amplifier stage 104 of FIGS. 1-5 to illustrate another impedance circuit that can be implemented in a CTLE circuit. The transimpedance amplifier stage 1700 includes inverter(s) 130, inductors 1702, 1704, 1708, 1712, 1718, resistors 1706, 1714, and capacitors 1710, 1716. Any of the inductors, resistors, and capacitors can be programmable and can be implemented as illustrated in and described above with respect to any of FIGS. 9-16.

A first terminal of the inductor 1702 is electrically connected to the intermediate node 152/452, which is the input node of the transimpedance amplifier stage 1700. A second terminal of the inductor 1702 (opposite from the first terminal) is electrically connected to respective first terminals of the inductor 1704 and the resistor 1706. A second terminal of the inductor 1704 (opposite from the first terminal) is electrically connected to the input node(s) of the inverter(s) 130. A second terminal of the resistor 1706 (opposite from the first terminal) is electrically connected to respective first terminals of the inductor 1708 and the capacitor 1710.

Output node(s) of the inverter(s) 130 are electrically connected to a first terminal of the inductor 1712. Respective second terminals (opposite from the first terminal) of the capacitor 1710, inductor 1708, and inductor 1712 are electrically connected together and to respective first terminals of the resistor 1714 and the inductor 1718. A second terminal of the resistor 1714 (opposite from the first terminal) is electrically connected to a first terminal of the capacitor 1716. A second terminal of the capacitor 1716 (opposite from the first terminal) is electrically connected to a ground node. A second terminal of the inductor 1718 (opposite from the first terminal) is electrically connected to the output voltage ($v_o$) node 158.

Implementing the inductors 1702, 1704, 1708, 1712, 1718 as shown in FIG. 17 can permit bandwidth extension and/or additional peaking of the frequency response of the CTLE circuit. For example, shunt peaking may be implemented by implementing the inductor 1708 as shown. Any one or more of the inductors 1702, 1704, 1712, 1718 may be implemented, and any one or more of the inductors 1702, 1704, 1712, 1718 may be omitted. Further, magnetic mutual coupling may be implemented with the inductors 1702, 1704, 1712, 1718. Additionally, implementing the resistor 1714 and capacitor 1716 as shown can implement a notch filter or a low-pass filter at the output voltage ($v_o$) node 158.

A CTLE circuit can include programmable elements, such as programmable inverters (like in FIGS. 7 and 8) and programmable impedance circuits. A CTLE circuit can be non-programmable, or can include a combination of programmable and non-programmable elements. Programmability of a CTLE circuit can enable setting different DC or low frequency gains of the frequency response of the CTLE circuit, setting different poles in the frequency response, and/or setting different zeros in the frequency response.

Programmability of a CTLE circuit can permit the CTLE circuit to be implemented in a broad number of applications. For example, different applications can have communication channels that have different frequency responses, and by programming the CTLE circuit, the CTLE circuit can implement an appropriate frequency response to equalize the signal that is communicated through the communication channel of the application.

In some examples, a CTLE circuit can be programmed by a user manually, and in some examples, the CTLE circuit can be programmed dynamically using an appropriate adaptation algorithm. For example, where a frequency response of a communication channel and of the CTLE circuit can remain substantially static, the CTLE circuit can be programmed once and can continue to operate based on that programming without being reprogrammed. In other examples, operating conditions of the CTLE circuit and/or communication channel can cause a frequency response to change. An adaptation algorithm can detect the changing conditions and can dynamically reprogram the CTLE circuit. For example, a changing temperature and/or operating voltage of the CTLE circuit can affect a frequency response of the CTLE circuit. The changing temperature and/or operating voltage can be detected by a process-voltage-temperature (PVT) monitor, and an adaptation unit (e.g., a processor executing an adaptation algorithm) can responsively reprogram the CTLE circuit based on the changed conditions detected by the PVT monitor.

Figure 18:
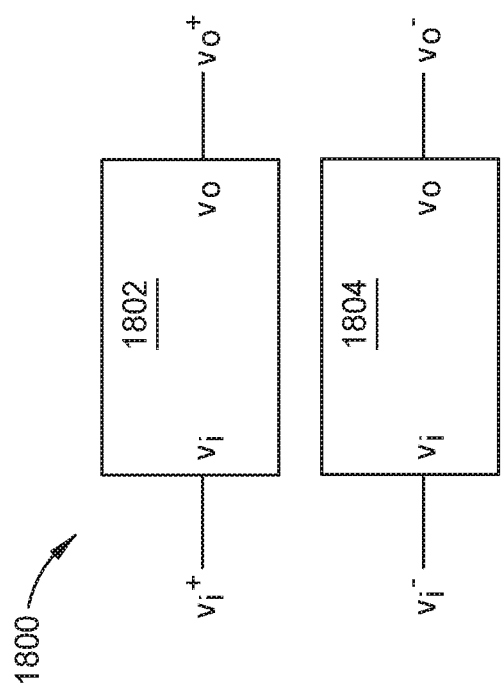
FIG. 18 is a schematic of a pseudo differential CTLE circuit according to some examples.

A CTLE circuit can be single-ended or pseudo differential. Example single-ended CTLE circuits are in FIGS. 1-5. FIG. 18 is a schematic of a pseudo differential CTLE circuit 1800 according to some examples. The pseudo differential CTLE circuit 1800 includes a first CTLE circuit 1802 (e.g., a single-ended CTLE circuit like in FIGS. 1-5) and a second CTLE circuit 1804 (e.g., a single-ended CTLE circuit like in FIGS. 1-5). The first CTLE circuit 1802 and the second CTLE circuit 1804 can be, and can operate, separate and independent from each other. An input voltage ($v_i$) node of the first CTLE circuit 1802 is electrically connected to a positive input voltage ($v_i^+$) node, and an output voltage ($v_o$) node of the first CTLE circuit 1802 is electrically connected to a positive output voltage ($v_o^+$) node. An input voltage ($v_i$) node of the second CTLE circuit 1804 is electrically connected to a negative input voltage ($v_i^-$) node, and an output voltage ($v_o$) node of the second CTLE circuit 1804 is electrically connected to a negative output voltage ($v_o^-$) node. The pseudo differential CTLE circuit 1800 is configured to receive a differential signal on the positive and negative input voltage ($v_i^+$, $v_i^-$) nodes and output a differential signal on the positive and negative output voltage ($v_o^+$, $v_o^-$) nodes. A differential signal output by the pseudo differential CTLE circuit 1800 can have an increased signal-to-noise ratio (SNR).

Figure 19:
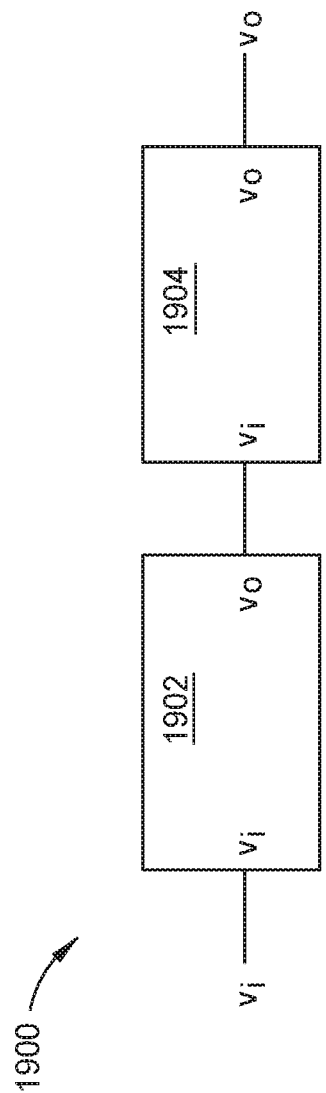
FIG. 19 is a schematic of cascaded CTLE circuits according to some examples.

CTLE circuits can also be cascaded. FIG. 19 is a schematic of cascaded CTLE circuits 1900 according to some examples. The cascaded CTLE circuits 1900 include a first CTLE circuit 1902 and a second CTLE circuit 1904. Any number of CTLE circuits can be cascaded together. An output voltage ($v_o$) node of the first CTLE circuit 1902 is electrically connected to an input voltage ($v_i$) node of the second CTLE circuit 1904 to cascade the CTLE circuits 1902, 1904. Frequency responses of the first CTLE circuit 1902 and the second CTLE circuit 1904 can be the same or different. While FIG. 19 illustrates two cascaded CTLE circuits, any number (e.g., three, four, etc.) of CTLE circuits can be cascaded.

Some implementations of a CTLE circuit include wireline serializer-deserializer (SerDes) circuits. The SerDes circuits can be implemented for communication of an electrical signal through a communication channel, or for communication of an optical signal through a communication channel.

A CTLE circuit can be implemented in a receiver circuit or in a transmitter circuit. A CTLE circuit can be implemented before or after a gain stage or other analog circuits in a receiver circuit. A CTLE circuit can be implemented in a transmitter circuit before or after other analog transmission circuits and/or after digital transmission stage stages. In an electrical link interface, a CTLE circuit can serve as either the final driver stage or the pre-driver stages for both fan-out optimization and equalization. Furthermore, a CTLE circuit can be implemented in a transmitter in conjunction with an optical transmitter circuit—placed before an optical transmission circuits or before analog circuits that precede the optical transmission circuits.

Figure 20:
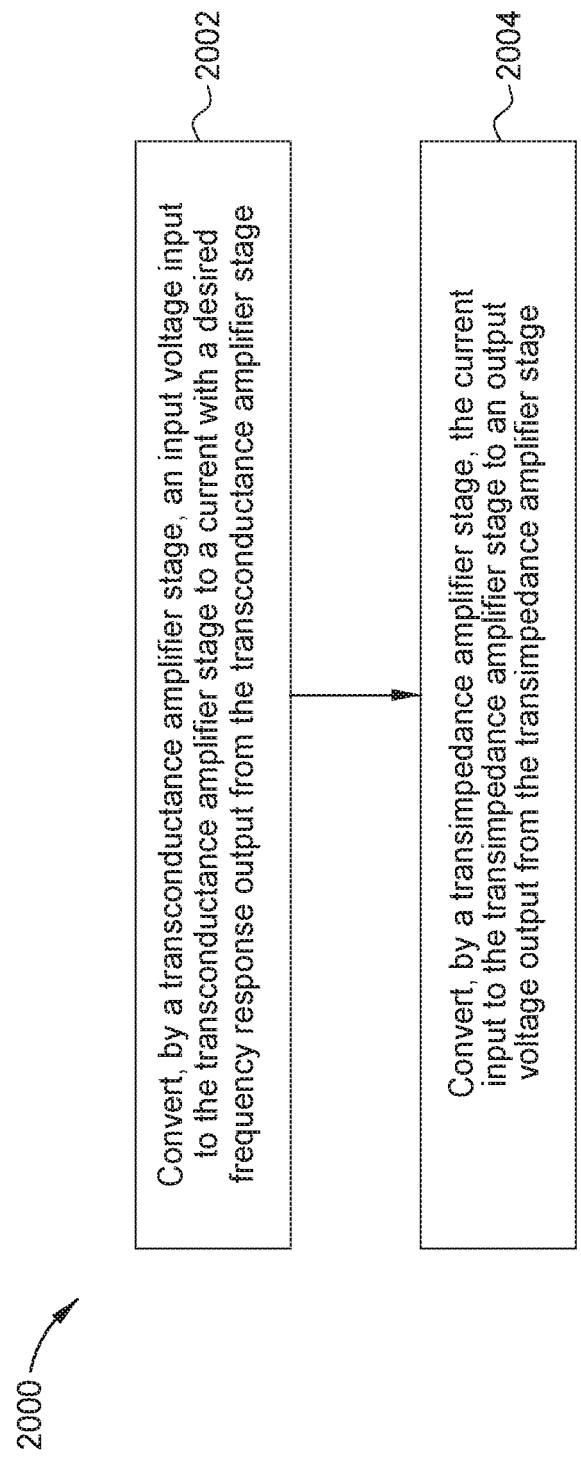
FIG. 20 is a flowchart of an operation of a CTLE circuit according to some examples.

FIG. 20 is a flowchart of an operation 2000 of a CTLE circuit according to some examples. The operation 2000 is described in the context of the CTLE circuits 100, 400 of FIGS. 1 and 4, and can also be implemented in any other CTLE circuit described above or another CTLE circuit. Although some aspects of the CTLE circuits 100, 400 are described below, the CTLE circuit implementing the operation 2000 of FIG. 20 can have any feature, component, or aspect that is described above. A person having ordinary skill in the art will readily understand the applicability of the description below to other CTLE circuits.

At block 2002, a transconductance amplifier stage converts an input voltage input to the transconductance amplifier stage to a current with a desired frequency response output from the transconductance amplifier stage. For example, an input voltage ($v_i$) is applied on the input voltage ($v_i$) node 150, 450, and is therefore input to the transconductance amplifier stage 102, 402 of the CTLE circuit 100, 400. The transconductance amplifier stage 102, 402 converts the input voltage ($v_i$) to a current 160, 460 that is output from the transconductance amplifier stage 102.

The transconductance amplifier stage can have a primary path and a feed forward path. For example, the primary path of the transconductance amplifier stage 102, 402 includes one or more inverters 110, 410. The primary path can convert the input voltage to a primary path current. For example, the one or more inverters 110, 410 in the primary path can receive the input voltage ($v_i$) from the input voltage ($v_i$) node 150, 450 and convert the input voltage ($v_i$) to a primary path current 162, 462.

In some examples, the feed forward path can be configured to be subtractive from the primary path. For example, the feed forward path of the transconductance amplifier stage 102 includes an inverter 112, an inverter 114, an impedance circuit 116, and one or more inverters 118. The feed forward path can convert the input voltage ($v_i$) to a feed forward path current. For example, the inverter 112 in the feed forward path can receive the input voltage ($v_i$) from the input voltage ($v_i$) node 150 and, together with the inverter 114, can responsively generate a voltage on the first feed forward path node 154 that is passed through the impedance circuit 116. A passed voltage through the impedance circuit 116 is then converted by the one or more inverters 118 to a feed forward path current 164. The primary path current 162 and the feed forward path current 164 are summed at the output node of the transconductance amplifier stage 102 (e.g., the intermediate node 152) to generate the current 160 that is output from the transconductance amplifier stage 102. The primary path and the feed forward path are configured such that the feed forward path current 164 is subtractive from the primary path current 162.

In some examples, the feed forward path can be configured to be additive to the primary path. For example, the feed forward path of the transconductance amplifier stage 402 includes an inverter 412, an inverter 414, and an impedance circuit 418. The feed forward path can convert the input voltage ($v_i$) to a feed forward path current. For example, the inverter 412 in the feed forward path can receive the input voltage ($v_i$) from the input voltage ($v_i$) node 450 and, together with the inverter 414, can responsively generate a current on the first feed forward path node 454 that is passed through the impedance circuit 418. A current from the impedance circuit 418 is a feed forward path current 464. The primary path current 462 and the feed forward path current 464 are summed at the output node of the transconductance amplifier stage 402 (e.g., the intermediate node 452) to generate the current 460 that is output from the transconductance amplifier stage 402. The primary path and the feed forward path are configured such that the feed forward path current 464 is additive to the primary path current 462.

At block 2004, a transimpedance amplifier stage converts the current input to the transimpedance amplifier stage to an output voltage output from the transimpedance amplifier stage. For example, the current 160, 460 is received at an input node of the transimpedance amplifier stage 104 (e.g., the intermediate node 152, 452), and is therefore input to the transimpedance amplifier stage 104 of the CTLE circuit 100, 400. The transimpedance amplifier stage 104 converts the current 160, 460 to an output voltage ($v_o$) that is output from the transimpedance amplifier stage 104 (and hence, from the CTLE circuit 100, 400) on the output voltage ($v_o$) node 158.

Figure 21:
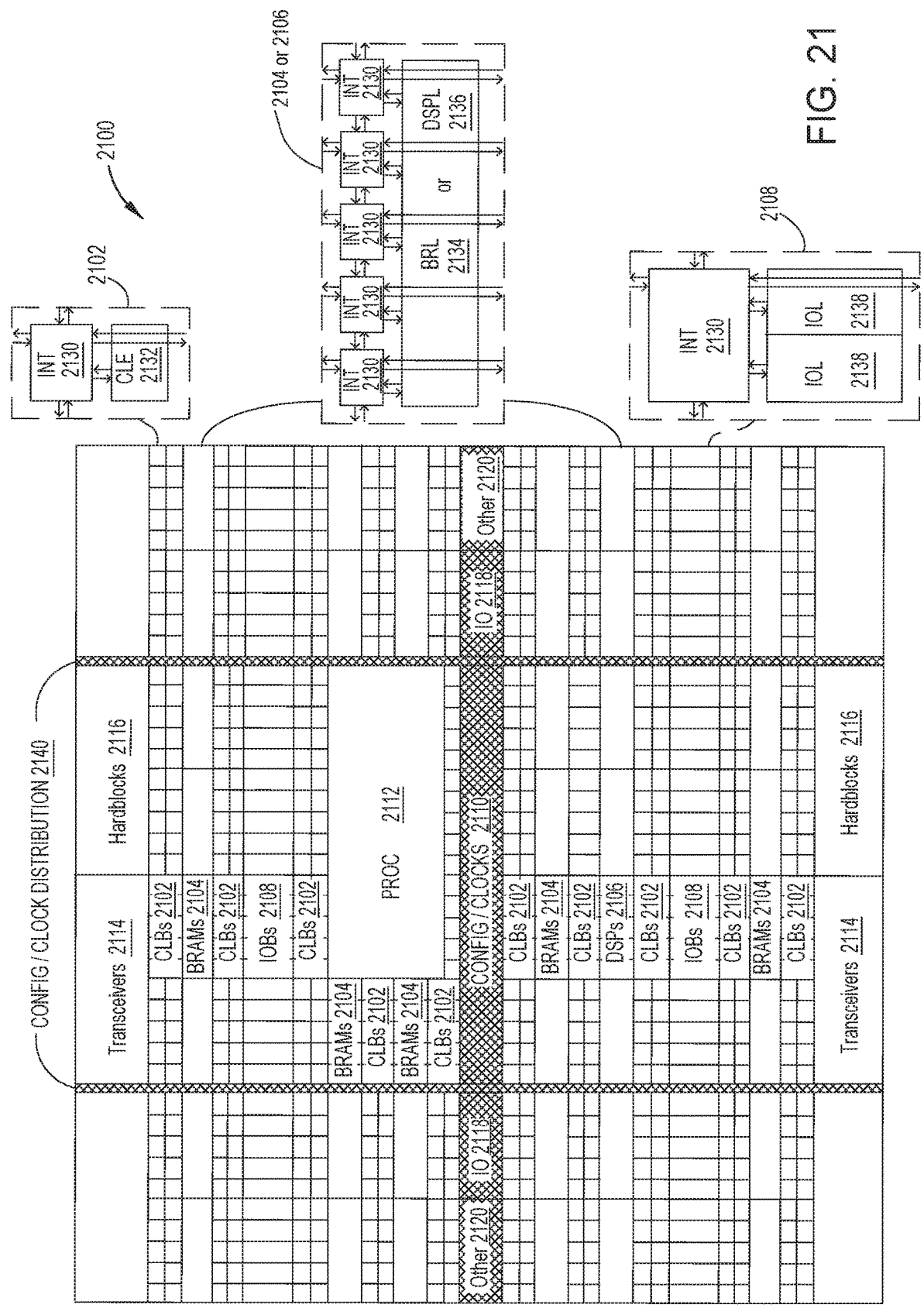
FIG. 21 illustrates a field programmable gate array (FPGA) that may be implemented as a programmable device according to some examples.

FIG. 21 illustrates a field programmable gate array (FPGA) 2100 that may be implemented as a programmable device according to some examples. The FPGA 2100, in the illustrated example, is an integrated circuit that includes a CTLE circuit. The FPGA 2100 includes a large number of different programmable tiles that form a programmable fabric including configurable logic blocks (CLBs) 2102, random access memory blocks (BRAMs) 2104, signal processing blocks (DSPs) 2106, input/output blocks (IOBs) 2108, and configuration and clocking logic (CONFIG/CLOCKS) 2110. The FPGA 2100 also includes a dedicated processor block 2112, digital transceivers 2114, dedicated hardblocks 2116, specialized input/output blocks (IO) 2118 (e.g., configuration ports and clock ports), and other programmable logic 2120 such as digital clock managers, system monitoring logic, and so forth. The hardblocks 2116 can be any circuit, such as a memory controller, a Peripheral Component Interconnect Express (PCIe) hardblock, etc. In some examples, the digital transceivers 2114 include a CTLE circuit as described above.

In the illustrated FPGA 2100, each programmable tile includes a programmable interconnect element (INT) 2130 having connections to input and output terminals of respective programmable interconnect elements 2130 in each adjacent tile and having connections to input and output terminals of a programmable logic element within the same tile. The programmable interconnect elements 2130 taken together implement a programmable interconnect structure for the illustrated FPGA 2100.

As an example, a CLB 2102 includes a configurable logic element (CLE) 2132 that can be programmed to implement user logic plus a single programmable interconnect element 2130. A BRAM 2104 can include a BRAM logic element (BRL) 2134 in addition to one or more programmable interconnect elements 2130. Typically, the number of interconnect elements included in a tile depends on the height of the tile. In the illustrated example, a BRAM tile has the same height as five CLBs, but other numbers (e.g., four) can also be used. A signal processing block 2106 can include a DSP logic element (DSPL) 2136 in addition to an appropriate number of programmable interconnect elements 2130. An input/output block 2108 can include, for example, two instances of an input/output logic element (IOL) 2138 in addition to one instance of the programmable interconnect element 2130. As will be clear to those of skill in the art, the actual I/O pads connected, for example, to the input/output logic element 2138 typically are not confined to the area of the input/output logic element 2138.

In the illustrated example, a horizontal area near the center of the die is used for configuration, clock, and other control logic. Vertical columns 2140 extending from this horizontal area or column are used to distribute the clocks and configuration signals across the breadth of the FPGA.

Some FPGAs utilizing the architecture illustrated in FIG. 21 include additional logic blocks that disrupt the regular columnar structure making up a large part of the FPGA. The additional logic blocks can be programmable blocks and/or dedicated logic. For example, processor block 2112 spans several columns of CLBs and BRAMs.

Note that FIG. 21 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 21 are purely exemplary. For example, in an actual FPGA, more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. An integrated circuit comprising:
a first transconductance amplifier stage having a first input node and a first output node, the first transconductance amplifier stage including a first path connected between the first input node and the first output node, and a second path electrically connected between the first input node and the first output node, the first path comprising a first plurality of inverters having a first complementary device inverter; and
a first transimpedance amplifier stage having a second input node and a second output node, the first output node being electrically connected to the second input node, the first transimpedance amplifier stage comprising a second complementary device inverter.

2. The integrated circuit of claim 1, wherein
the first path is configured to output a first current; and
the second path is configured to output a second current, the second path being configured such that the second current is subtractive to the first current at the first output node.

3. The integrated circuit of claim 1, wherein
the first path is configured to output a first current; and
the second path is configured to output a second current, the second path being configured such that the second current is additive to the first current at the first output node.

4. The integrated circuit of claim 1, wherein
the first complementary device inverter comprises an input node electrically connected to the first input node and an output node electrically connected to the first output node; and
the second path comprises a third complementary device inverter, a fourth complementary device inverter, a first impedance circuit, and a fifth complementary device inverter, the third complementary device inverter having an input node electrically connected to the first input node and having an output node electrically connected to an output node of the fourth complementary device inverter and to a first terminal of the first impedance circuit, a second terminal of the first impedance circuit being electrically connected to an input node of the fifth complementary device inverter, an output node of the fifth complementary device inverter being electrically connected to the first output node.

5. The integrated circuit of claim 4, wherein the first transconductance amplifier stage includes:
a third path comprising a sixth complementary device inverter, a seventh complementary device inverter, a second impedance circuit, and an eighth complementary device inverter, the sixth complementary device inverter having an input node electrically connected to the first input node and having an output node electrically connected to an output node of the seventh complementary device inverter and to a first terminal of the second impedance circuit, a second terminal of the second impedance circuit being electrically connected to an input node of the eighth complementary device inverter, an output node of the eighth complementary device inverter being electrically connected to the first output node.

6. The integrated circuit of claim 4, wherein the second path comprises a first branch and a second branch, the first branch comprising the first impedance circuit and the fifth complementary device inverter, the second branch comprising a second impedance circuit and a sixth complementary device inverter, the output node of the third complementary device inverter further being electrically connected to a first terminal of the second impedance circuit, a second terminal of the second impedance circuit being electrically connected to an input node of the sixth complementary device inverter, an output node of the sixth complementary device inverter being electrically connected to the first output node.

7. The integrated circuit of claim 4, wherein at least one of the first complementary device inverter, the second complementary device inverter, the third complementary device inverter, the fourth complementary device inverter, the first impedance circuit, the fifth complementary device inverter, or a combination thereof is programmable.

8. The integrated circuit of claim 1, wherein
the first complementary device inverter comprises an input node electrically connected to the first input node and comprises an output node electrically connected to the first output node; and
the second path comprises a third complementary device inverter, a fourth complementary device inverter, and a first impedance circuit, the third complementary device inverter having an input node electrically connected to the first input node and having an output node electrically connected to an output node of the fourth complementary device inverter and to a first terminal of the first impedance circuit, a second terminal of the first impedance circuit being electrically connected to the first output node.

9. The integrated circuit of claim 8, wherein the first transconductance amplifier stage includes:
a third path comprising a fifth complementary device inverter, a sixth complementary device inverter, and a second impedance circuit, the fifth complementary device inverter having an input node electrically connected to the first input node and having an output node electrically connected to an output node of the sixth complementary device inverter and to a first terminal of the second impedance circuit, a second terminal of the second impedance circuit being electrically connected to the first output node.

10. The integrated circuit of claim 8, wherein at least one of the first complementary device inverter, the second complementary device inverter, the third complementary device inverter, the fourth complementary device inverter, the first impedance circuit, or a combination thereof is programmable.

11. The integrated circuit of claim 1, wherein the first transimpedance amplifier stage further comprises an impedance circuit, the second complementary device inverter being electrically connected between the second input node and the second output node, the impedance circuit being electrically connected between the second input node and the second output node.

12. The integrated circuit of claim 1 further comprising:
a second transconductance amplifier stage having a third input node and a third output node, the second transconductance amplifier stage comprising a third complementary device inverter; and
a second transimpedance amplifier stage having a fourth input node and a fourth output node, the third output node being electrically connected to the fourth input node, the second transimpedance amplifier stage comprising a fourth complementary device inverter, the first input node and the third input node being configured to receive a differential signal, the second output node and the fourth output node being configured to output a differential signal.

13. The integrated circuit of claim 1 further comprising:
a second transconductance amplifier stage having a third input node and a third output node, the second output node being electrically connected to the third input node, the second transconductance amplifier stage comprising a third complementary device inverter; and
a second transimpedance amplifier stage having a fourth input node and a fourth output node, the third output node being electrically connected to the fourth input node, the second transimpedance amplifier stage comprising a fourth complementary device inverter.

14. An integrated circuit comprising:
a continuous time linear equalizer circuit comprising:
a transconductance amplifier stage having a first input node and a first output node, the transconductance amplifier stage comprising:
a first path comprising a first plurality of inverters electrically connected between the first input node and the first output node, the first plurality of inverters comprises a first complementary device inverter; and
a second path comprising a second complementary device inverter and a first impedance circuit, the second complementary device inverter and the first impedance circuit being electrically connected between the first input node and the first output node; and
a transimpedance amplifier stage having a second input node and a second output node, the first output node being electrically connected to the second input node, the transimpedance amplifier stage comprising a third complementary device inverter electrically connected between the second input node and the second output node.

15. The integrated circuit of claim 14, wherein:
the second path further comprises a fourth complementary device inverter;
an input node of the first complementary device inverter is electrically connected to the first input node;
an output node of the first complementary device inverter is electrically connected to the first output node;
an input node of the second complementary device inverter is electrically connected to the first input node;
an output node of the second complementary device inverter is electrically connected to a first terminal of the first impedance circuit;
a second terminal of the first impedance circuit is electrically connected to an input node of the fourth complementary device inverter; and
an output node of the fourth complementary device inverter is electrically connected to the first output node.

16. The integrated circuit of claim 14, wherein:
an input node of the first complementary device inverter is electrically connected to the first input node;
an output node of the first complementary device inverter is electrically connected to the first output node;
an input node of the second complementary device inverter is electrically connected to the first input node;
an output node of the second complementary device inverter is electrically connected to a first terminal of the first impedance circuit; and
a second terminal of the first impedance circuit is electrically connected to the first output node.

17. The integrated circuit of claim 14, wherein the transimpedance amplifier stage further comprises a second impedance circuit electrically connected between the second input node and the second output node.

* * * * *